(12) United States Patent
Nelson et al.

(10) Patent No.: US 11,294,711 B2
(45) Date of Patent: Apr. 5, 2022

(54) WAIT A DURATION TIMER ACTION AND FLOW ENGINE FOR BUILDING AUTOMATED FLOWS WITHIN A CLOUD BASED DEVELOPMENT PLATFORM

(71) Applicant: ServiceNow, Inc., Santa Clara, CA (US)

(72) Inventors: Harry Thomas Nelson, San Diego, CA (US); Reema Shah, San Diego, CA (US); Jacob Samuel Burman, Carlsbad, CA (US); Alejandro Moreno Ruiz, San Diego, CA (US); Rebecca Anita Dias, Seattle, WA (US)

(73) Assignee: ServiceNow, Inc., Santa Clara, CA (US)

( * ) Notice: Subject to any disclaimer, the term of this patent is extended or adjusted under 35 U.S.C. 154(b) by 173 days.

(21) Appl. No.: 16/255,695

(22) Filed: Jan. 23, 2019

(65) Prior Publication Data

US 2020/0089524 A1  Mar. 19, 2020

Related U.S. Application Data

(60) Provisional application No. 62/732,388, filed on Sep. 17, 2018.

(51) Int. Cl.
*G06F 9/48* (2006.01)
*H04L 29/08* (2006.01)
(Continued)

(52) U.S. Cl.
CPC ............ *G06F 9/485* (2013.01); *G06F 40/169* (2020.01); *H04L 41/22* (2013.01); *H04L 67/1097* (2013.01)

(58) Field of Classification Search
CPC ... G06F 9/485; G06F 40/169; H04L 67/1097; H04L 41/22
See application file for complete search history.

(56) References Cited

U.S. PATENT DOCUMENTS 6,321,229 B1   11/2001   Goldman
6,553,419 B1 * 4/2003   Ram ................... G06F 11/3476
                                                 709/224
(Continued)

OTHER PUBLICATIONS

Oracle Fusion Middleware 11g Release 1 (11.1.1.6.1) Feb. 2012 (Year: 2012).*

(Continued)

*Primary Examiner* — Michael W Ayers
(74) *Attorney, Agent, or Firm* — Fletcher Yoder PC

(57) ABSTRACT

A wait duration for a timer action element of a design-time flow plan is set. The wait duration being set relative to a specified data point of a table associated with the design-time flow plan. An operation associated with the timer action element executes at run-time to pause a flow for the wait duration prior to execution of an operation associated with an action element that is set to execute subsequent to the timer action element in the design-time flow plan. A specified timeframe for the timer action element of the design-time flow plan is set. The operation associated with the timer action element to pause the flow for the specified wait duration executes at run-time during the set specified timeframe. A natural language annotation associated with the timer action element of the design-time flow plan is displayed. The annotation presents the set duration and timeframe in a human-readable format.

20 Claims, 14 Drawing Sheets

(51) Int. Cl.
*H04L 12/24* (2006.01)
*G06F 40/169* (2020.01)

(56) References Cited

U.S. PATENT DOCUMENTS

| | | | | |
|---|---|---|---|---|
| 6,757,897 B1 * | 6/2004 | Shi | ......................... | G06F 9/4843 710/240 |
| 6,889,375 B1 * | 5/2005 | Chan | ..................... | G06Q 10/06 717/123 |
| 7,020,706 B2 | 3/2006 | Cates | | |
| 7,350,209 B2 | 3/2008 | Shum | | |
| 7,716,353 B2 | 5/2010 | Golovinsky | | |
| 7,769,718 B2 | 8/2010 | Murley | | |
| 7,890,802 B2 | 2/2011 | Gerber | | |
| 7,925,981 B2 | 4/2011 | Pourheidari | | |
| 8,151,261 B2 | 4/2012 | Sirota | | |
| 8,224,683 B2 | 7/2012 | Manos | | |
| 8,402,127 B2 | 3/2013 | Solin | | |
| 8,589,338 B2 * | 11/2013 | Maes | ................... | H04L 67/2838 707/608 |
| 8,612,408 B2 | 12/2013 | trinon | | |
| 8,646,093 B2 | 2/2014 | Myers | | |
| 8,776,085 B2 * | 7/2014 | Lv | ......................... | G06F 9/546 719/313 |
| 8,832,652 B2 | 9/2014 | Mueller | | |
| 8,930,497 B1 * | 1/2015 | Holmes | ............... | G06F 11/1456 709/219 |
| 9,065,783 B2 | 6/2015 | Ding | | |
| 9,098,322 B2 | 8/2015 | Apte | | |
| 9,122,552 B2 | 9/2015 | Whitney | | |
| 9,317,327 B2 | 4/2016 | Apte | | |
| 9,363,252 B2 | 6/2016 | Mueller | | |
| 9,535,737 B2 | 1/2017 | Joy | | |
| 9,557,969 B2 | 1/2017 | Sharma | | |
| 9,582,779 B1 * | 2/2017 | Bevan | ................. | G06Q 10/0633 |
| 9,645,833 B2 | 5/2017 | Mueller | | |
| 9,654,473 B2 | 5/2017 | Miller | | |
| 9,766,935 B2 | 9/2017 | Kelkar | | |
| 9,792,387 B2 | 10/2017 | George | | |
| 9,805,322 B2 | 10/2017 | Kelkar | | |
| 2010/0251339 A1 * | 9/2010 | McAlister | ............. | H04L 63/104 726/4 |
| 2015/0347354 A1 * | 12/2015 | Hatcher | ............... | G06F 16/9577 715/234 |
| 2017/0364843 A1 * | 12/2017 | Haligowski | ........ | G06Q 10/0633 |
| 2018/0136970 A1 * | 5/2018 | Nandagopal | .......... | G06F 9/4843 |
| 2020/0034540 A1 * | 1/2020 | Husson | ................. | H04L 9/0643 |

OTHER PUBLICATIONS

Vmware vRealize Orchestrator Developer's Guide vCenter Orchestrator 4.0.1 Copyright 2009, 2010 (Year: 2010).*

* cited by examiner

WAIT A DURATION TIMER ACTION AND FLOW ENGINE FOR BUILDING AUTOMATED FLOWS WITHIN A CLOUD BASED DEVELOPMENT PLATFORM

CROSS-REFERENCE TO RELATED APPLICATIONS

This application claims priority to U.S. Provisional Patent Application Ser. No. 62/732,388 filed Sep. 17, 2018, and entitled "Flow Designer Timer," the contents of which are incorporated herein by reference.

TECHNICAL FIELD

Embodiments described herein generally relate to cloud computing and more specifically, to creating and executing within a cloud based development platform, an automated process that implements logic to pause a flow a specified duration of time.

BACKGROUND

Cloud computing relates to sharing of computing resources that are generally accessed via the Internet. Cloud computing infrastructure allows users to access a shared pool of computing resources, such as servers, storage devices, networks, applications, and/or other computing-based services. By doing so, users, such as individuals and/or enterprises, can access computing resources on demand that are located at remote locations in order to perform a variety of computing functions that include storing and/or processing computing data. For enterprise and other organization users, cloud computing provides flexibility in accessing cloud computing resources without accruing up-front costs, such as purchasing network equipment and investing time in establishing a private network infrastructure. Instead, by utilizing cloud computing resources, users are able redirect their resources to focus on core enterprise functions.

In today's communication networks, examples of cloud computing services a user may utilize include software as a service (SaaS) and application platform as a service (aPaaS) technologies. SaaS is a delivery model that provides software as a service rather than an end product. Instead of utilizing local network or individual software installations, software is typically licensed on a subscription basis, hosted on a remote machine, and accessed as needed. For example, users are generally able to access a variety of enterprise and/or information technology (IT) related software via a web browser. Further, aPaaS acts as an extension of SaaS that goes beyond providing software services by offering customizability and expandability features to meet a user's needs. For example, aPaaS can provide a cloud-based developmental platform for users to develop, modify, and/or customize applications and/or automate enterprise operations without maintaining network infrastructure and/or allocating computing resources normally associated with these functions. Within the context of automating enterprise, IT, and/or other organization-related functions (e.g., human resources (HR)), an aPaaS platform often provides users an array of tools to implement complex behaviors, such as enterprise rules, scheduled jobs, events, and scripts, to build automated processes and to integrate with third party systems.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment a method includes: setting a specified wait duration for a timer action element of a design-time flow plan, the specified wait duration being set relative to a specified data point of a table associated with the design-time flow plan, wherein an operation associated with the timer action element executes at run-time to pause a flow for the specified wait duration prior to execution of an operation associated with an action element that is set to execute subsequent to the timer action element in the design-time flow plan; setting a specified timeframe for the timer action element of the design-time flow plan, wherein the operation associated with the timer action element to pause the flow for the specified wait duration executes at run-time during the set specified timeframe; displaying a natural language annotation associated with the timer action element of the design-time flow plan, wherein the natural language annotation presents the set specified wait duration and timeframe for the timer action element in a human-readable format in the design-time flow plan; and activating the design-time flow plan.

In another embodiment, the method may be embodied in computer executable program code and stored in a non-transitory storage device. In yet another embodiment, the method may be implemented on a cloud-based computer system.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
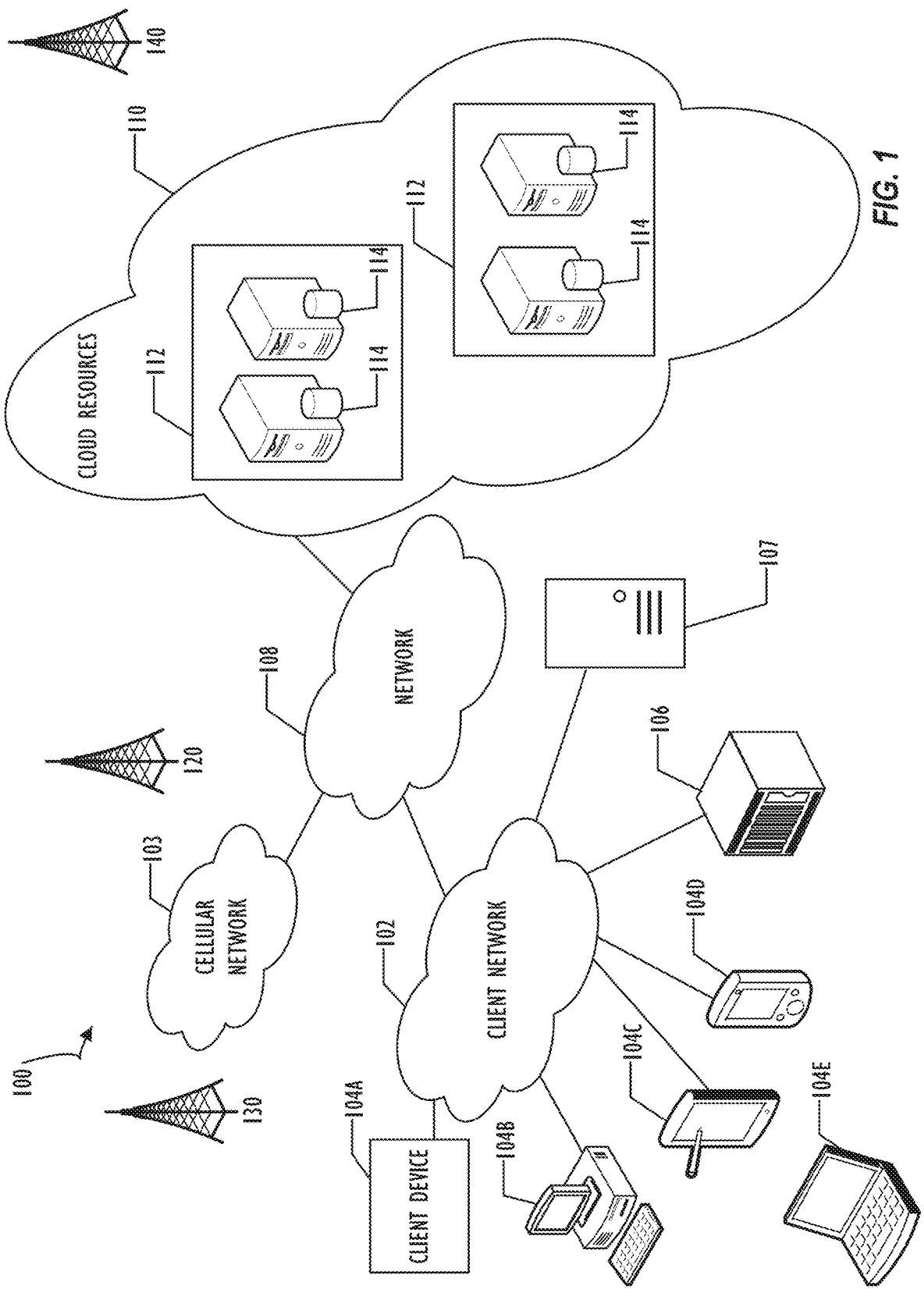
FIG. 1 is a schematic diagram of an embodiment of a cloud computing system where embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form to avoid obscuring the disclosed embodiments. Moreover, the language used in this disclosure has been principally selected for readability and instructional purposes, and may not have been selected to delineate or circumscribe the inventive subject matter, resorting to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "computing system" is generally taken to refer to at least one electronic computing device that includes, but is not limited to a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

As used herein, the term "flow plan" or "sub-flow plan" refers to a configured, automated process for addressing one or more tasks. In one or more embodiments, the tasks (e.g., action elements, timer action elements) for the flow plan correspond to a variety of enterprise and/or other organization-relation functions. Categories of tasks that relate to enterprise and/or other organization functions include, but are not limited to HR operations, customer service, security protection, enterprise applications, IT management, and/or IT operation. In one embodiment, flow plans are created on a flow plan development platform, such as a Web 2.0 development platform written in Java® (JAVA is a registered trademark owned by Oracle America, Inc.).

As used herein, the term "global state" refers to one or more global parameters or global variables that are accessible for an entire application. Examples of parameters or variables for a global state include, but are not limited to, process and task execution statuses and resource conditions. In one embodiment, a centralized decision-making component, such as a centralized controller, is able to track the global state and determine execution orders for operations within a workflow.

To further simplify the process for a user to design, manage, modify, and run automated processes (e.g., flows or flow plans, sub-flows or sub-flow plans, enterprise rules, enterprise logic, script includes, scheduled jobs and the like) for various enterprise, IT, and/or other organization-related functions, and to address abstraction (e.g., providing domain-appropriate building blocks), code reuse (e.g., having defined application programming interface (API) semantics), and/or codeless development, an aPaaS platform (e.g., cloud-based development platform) may provide additional tools allowing designers to perform low code/no code development in a natural language authoring environment. The low code/no code, natural language process automation may enable users with little or no custom scripting knowledge to be able to design, manage, modify, and run automated processes. In the context of implementing complex behaviors using automated processes on the aPaaS platform, it may be further desirable to allow the user to set wait timers in the automated processes so as to incorporate a wait step during execution of the automated processes.

This disclosure pertains to providing tools that can be easily used to pause an automated process for a specified period of time during execution of the automated process on an aPaaS platform. Incorporation of the wait step during execution of the automated process allows the system to wait for a user to act during the automated process, or to wait for a specific date and time to complete one or more actions (e.g., computing actions) of the automated process. The automated process within the aPaaS environment automatically performs one or more tasks (e.g., action element, timer action element) related to a variety of enterprise and/or other organization-relation functions. In one embodiment, a natural language process automation platform (e.g., flow designer) within the aPaaS environment allows the user to create, modify, manage, and execute flow plans (e.g., flows or sub-flows) to which different action elements can be added during design-time for perform several different enterprise and/or other organization-related functions. One of the action elements that can be added to the flow plan during design-time can be a timer action element to incorporate the wait step when the flow plan is subsequently executed based on a trigger.

To create, modify, manage, and execute the flow plans, the aPaaS platform includes a flow designer system that constructs design-time flow plans that may implement timer action elements for incorporating wait steps and a flow engine that executes run-time versions of the design-time flow plans and executes the incorporated wait steps consistent with a set configuration. Although referred to as design-time "flow plans" here, the disclosure also applies for design-time "sub-flow plans." The flow designer system includes a flow plan designer user interface that presents to a user, one or more selectable action elements (e.g., timer action element), trigger elements, and/or input/output elements for constructing the design-time flow plan, an action designer user interface that allows a user to construct action elements out of action steps, a wait timer setting module that allows the user to configure settings for the timer action element, and a web service API (e.g., REST API) to interface with a data model. The flow plan designer user interface, the action designer user interface, wait timer setting module, and the web service API drive the data model so that the design-time flow plan can be continuously updated and/or saved. Once the flow designer system receives instructions to publish (e.g., save or activate) the flow plan, the flow designer system may call a flow plan builder API to generate a run-time version of the design-time flow plan based on the data model. Afterwards, a flow engine may execute the run-time flow plan without utilizing a global state to manage flow execution order. Instead, the flow engine may execute each operation within the run-time flow plan (including the wait operation of the timer action element) when it is ready to run and repopulates a queue as operations are executed until there are no remaining ready operations. For example, based on the settings configured by the wait timer setting module, the flow engine may execute an operation to incorporate the wait step for the specified length of time corresponding to the timer action element without holding up a thread. The flow engine may put system resources to sleep for the specified length of time, and after elapse of the specified length of time, the flow engine may employ one or more worker threads to execute operations associated with one or more action elements set to execute subsequent to the timer action element in the design-time flow plan. An operation within the run-time flow plan may be ready to run when the operation's input values are ready and the flow engine has completed any predecessor operations.

A trigger element corresponding to the flow plan (e.g., flow or sub-flow plan) can be defined to trigger execution of the flow plan when one or more predetermined computing conditions are met (e.g., create, read, update or delete (CRUD) operation for a record in a particular table on top of which the flow plan is triggered, one or more filter conditions satisfied for the CRUD record on the particular table, timer expiration, schedule, inbound Representational State Transfer (REST) API call (call may originate anywhere on aPaaS platform), and the like). Once the trigger element condition(s) is satisfied, one or more action elements defined in the flow plan may be executed. In case of a sub-flow, the trigger may be a call to the API of the sub-flow, where the call may originate anywhere on the aPaaS platform (e.g., from automated script, user interface action, and the like). The API call may originate as a result of satisfaction of one or more of the predetermined computing conditions. In case of either the flow plan or sub-flow plan one of the action elements may be a timer action element that executes to introduce the wait step during subsequent execution of the flow plan upon the trigger being activated. The timer action element of the design-time flow plan may be set to specify a wait period indicating the duration (e.g., length of time) of the wait step to be introduced during execution of the flow plan. The wait duration may be set to be relative to a specified data point (e.g., field, column, or attribute) of a table associated with the flow plan (e.g., wait for specified length of time after a triggering record is updated (where the time the record is updated acts as the date and time value for the specified data point)). Thus, for example, an operation to pause the flow during execution for a specified length of time may be executed after a date and time value associated with the specified data point of a record on the table that activated the trigger element becomes current. In other words, for example, the flow may be paused for the specified length of time (only) after arrival of the date and time specified by the data point associated with the record that triggered the execution of the automated process (flow plan). In one or more embodiments, the operation to pause the flow for the specified length of time may be executed only during a specified timeframe (e.g., system schedule). For example, the timeframe may be set so that the flow may execute only during business hours of an enterprise. Thus, if the flow is triggered outside of business hours, the flow engine may halt execution of the run-time flow plan until start of business hours on the next business day. Once within the window of time defined by the set specified timeframe, the flow engine may execute the wait step of the timer action element of the flow.

The low code/no code, natural language process automation logic (e.g., flow designer) of the flow plan designer user interface for creating, managing, modifying and running flows on the aPaaS platform may also provide a "drag-and-drop" experience for easily and intuitively setting the specified data point of the table for setting the relative wait duration of the design-time flow plan. In this way, for example, based on the table specified by the user, the flow plan designer user interface may present for selection, corresponding available data points (e.g., attributes, columns, or fields of the selected table) the user can select from to set the specified data point whose date and time value will determine when the wait step will begin to execute during run-time.

FIG. 1 illustrates a block diagram of an embodiment of cloud computing infrastructure 100 where one or more embodiments of the present disclosure may operate. Cloud computing infrastructure 100 comprises client network 102, network 108, and cloud resources platform/network 110 (e.g., aPaaS environment or platform). In one embodiment, client network 102 may be a local private network such as LAN that includes a variety of network devices that include, but are not limited to switches, servers, and routers. Each of these networks can contain wired or wireless programmable devices and operate using any number of network protocols (e.g., TCP/IP) and connection technologies (e.g., Wi-Fi® networks, Bluetooth®). Wi-Fi is a registered trademark of the Wi-Fi Alliance. Bluetooth is a registered trademark of Bluetooth Special Interest Group. In another embodiment, client network 102 represents an enterprise network that could include or be communicatively coupled to one or more local area networks (LANs), virtual networks, data centers and/or other remote networks (e.g., 108, 110). As shown in FIG. 1, client network 102 may be connected to one or more client devices 104A-E and allow the client devices to communicate with each other and/or with cloud resources platform/network 110. Client devices 104A-E may be computing systems such as desktop computer 104B, tablet computer 104C, mobile phone 104D, laptop computer (shown as wireless) 104E, and/or other types of computing systems generically shown as client device 104A. FIG. 1 also illustrates that client network 102 may be connected to local compute resource 106 that may include a server, access point, router, or other device configured to provide for local computational resources and/or to facilitate communication amongst networks and devices. For example, local compute resource 106 may be one or more physical local hardware devices configured to communicate with wireless network devices and/or facilitate communication of data between client network 102 and other networks such as network 108 and cloud resources platform/network 110. Local compute resource 106 may also facilitate communication between other external applications, data sources, and services, and client network 102. FIG. 1 also illustrates that client network 102 may be connected to a computer configured to execute management, instrumentation, and discovery (MID) server 107. For example, MID server 107 may be a Java® application that runs as a Windows® service or UNIX® daemon. Java is a registered trademark of Oracle America, Inc. Windows is a registered trademark of Microsoft Corporation. UNIX is a registered trademark of The Open Group. MID server 107 may be configured to assist functions such as, but not necessarily limited to, discovery, orchestration, service mapping, service analytics, and event management. MID server 107 may be configured to perform tasks for a cloud-based instance while never initiating communication directly to the cloud-instance by utilizing a work queue architecture. This configuration may assist in addressing security concerns by eliminating that path of direct communication initiation.

Cloud computing infrastructure 100 also includes cellular network 103 for use with mobile communication devices. Mobile cellular networks support mobile phones and many other types of mobile devices such as laptops etc. Mobile devices in cloud computing infrastructure 100 are illustrated as mobile phone 104D, laptop 104E, and tablet 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices such as wireless access points and routers (e.g., local compute resource 106). In addition, the mobile devices may interact with other mobile devices or with non-mobile devices such as desktop computer 104B and various types of client device 104A for desired services. Although not specifically illustrated in FIG. 1, client network 102 may also include a dedicated network device (e.g., gateway or router) or a combination of network devices that implement a customer firewall or intrusion protection system.

FIG. 1 further illustrates that client network 102 is coupled to network 108. Network 108 may include one or more computing networks, such as other LANs, wide area networks (WANs), the Internet, and/or other remote networks, to transfer data between client devices 104A-E and cloud resources platform/network 110. Each of the computing networks within network 108 may contain wired and/or wireless programmable devices that operate in the electrical and/or optical domain. For example, network 108 may include wireless networks, such as cellular networks in addition to cellular network 103. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, cloud resources platform/network 110 is illustrated as a remote network (e.g., cloud network; aPaaS platform/network; aPaaS environment) that can communicate with client devices 104A-E via client network 102 and network 108. The cloud resources platform/network 110 acts as a platform that provides additional computing resources to client devices 104A-E and/or client network 102. For example, by utilizing the cloud resources platform/network 110, users of client devices 104A-E may be able to build and execute applications, such as automated processes for various enterprise, IT, field service and/or other organization-related functions. In one embodiment, cloud resources platform/network 110 includes one or more data centers 112, where each data center 112 could correspond to a different geographic location. Within a particular data center 112, a cloud service provider may include a plurality of server instances 114. Each server instance 114 may be implemented on a physical computing system, such as a single electronic computing device (e.g., a single physical hardware server) or could be in the form of a multi-computing device (e.g., multiple physical hardware servers). Examples of server instances 114 include, but are not limited to, a web server instance (e.g., a unitary Apache® installation), an application server instance (e.g., unitary Java Virtual Machine), and/or a database server instance (e.g., a unitary MySQL® catalog). Apache is a registered trademark of Apache Software Foundation. MySQL is a registered trademark of MySQL AB.

To utilize computing resources within cloud resources platform/network 110, network operators may choose to configure data centers 112 using a variety of computing infrastructures. In one embodiment, one or more of data centers 112 are configured using a multi-tenant cloud architecture such that a single server instance 114, which can also be referred to as an application instance, handles requests and serves more than one customer. In some cases, data centers with multi-tenant cloud architecture commingle and store data from multiple customers, where multiple client instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 114 causing outages for all customers allocated to the single server instance 114.

In another embodiment, one or more of the data centers 112 are configured using a multi-instance cloud architecture to provide every customer its own unique client instance. For example, a multi-instance cloud architecture could provide each client instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each client instance. In a multi-instance cloud architecture, multiple client instances could be installed on a single physical hardware server where each client instance (e.g., customer instance) is allocated certain portions of the physical server resources, such as computing memory, storage, and processing power. By doing so, each client instance has its own unique software stack that provides the benefit of data isolation, relatively less downtime for customers to access the cloud resources platform/network 110, and customer-driven upgrade schedules. An example of implementing a client instance within a multi-instance cloud architecture will be discussed in more detail below when describing FIG. 2.

Figure 7:
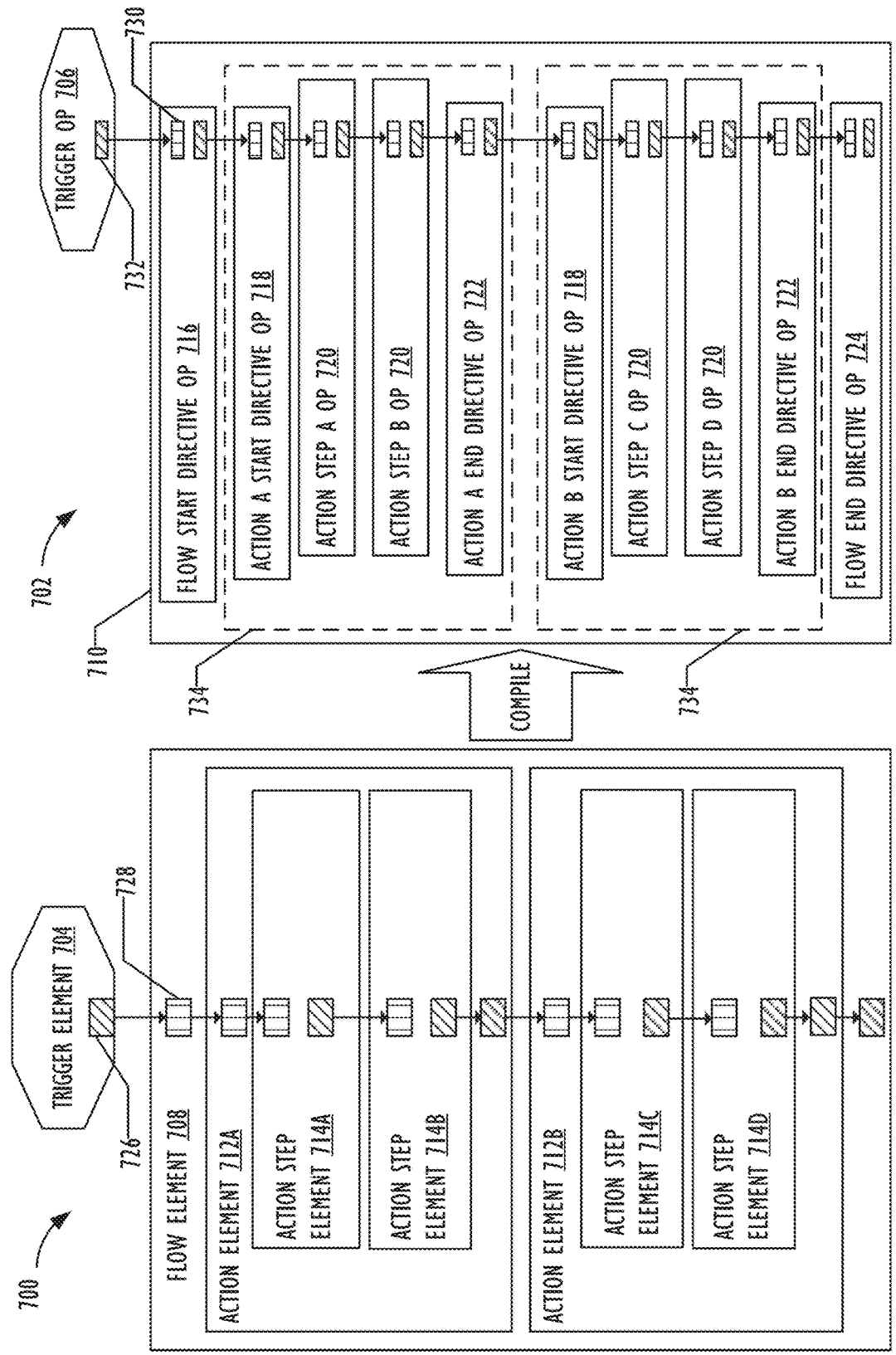
FIG. 7 is an illustration that maps the relationship between a design-time flow plan and a run-time flow plan.

In one embodiment, the client instance is hosted on an aPaaS platform (e.g., cloud-based platform, flow plan development platform) that creates, modifies, manages, and executes flow plans (e.g., flow plans or sub-flow plans). The aPaaS platform can include a flow plan creation component, and flow plan execution component. Prior to executing a flow plan, the aPaaS platform can create flow plans using a flow designer system of a flow plan development platform. As used herein, the term "design-time flow plan" refers to a flow plan (or sub-flow plan) during the creation phase and prior to being converted (e.g. compiled) by a flow plan builder. In one embodiment, the design-time flow plan contains one or more trigger elements, action elements, and/or (in case of sub-flow plans) input/output elements. A trigger element refers to something that initiates or activates when a certain condition or event is met (e.g., a record matching a filter is changed or created, a timer expires, and an inbound REST API call arrives). An action element (e.g., timer action element) refers to a sequence of action steps that processes some defined set of input values to generate a defined set of output values. Multiple action elements can be linked together and along with the trigger elements can form the design-time flow plan. An input/output element refers to selection of a table (that includes multiple data points) on top of which a sub-flow is configured to run, and whose data point (e.g., columns, attributes, or fields) values of a given record (e.g., triggering record) are accessible by action elements of the sub-flow. The sub-flow can be triggered from outside the flow designer system by calling the sub-flow's API. The API call (e.g., trigger element) may be the result of predetermined conditions being satisfied. During the flow plan execution phase, the flow plan development platform may execute a run-time version of the design-time flow plan using one or more flow engines. As used herein, the term "run-time flow plan" refers to a flow plan (or sub-flow plan) during the execution phase and after being converted (e.g., compiled) by a flow plan builder. In one embodiment, the run-time flow plan can be implemented as Java® Script Object Notation (JSON) document that includes a plurality of definitions. FIG. 7, which is discussed in detail below, illustrates an example of a design-time flow plan and a run-time flow plan.

In reference to the flow plan creation phase, in one embodiment, the flow designer system of the flow plan development platform includes a flow plan designer user interface, an action designer user interface, a wait timer setting module, and web service API that drives a data model that represents the design-time flow plan A user may use the flow designer system to create new design-time flow plans and/or make updates to an already existing design-time flow plan. The new design-time flow plans and/or changes made to existing design-time flow plans are stored as data models within aPaaS platform/network 110. When a user is satisfied with the created and/or updated design-time flow plan, the user will subsequently publish (e.g., activate or save) the design-time flow plan. During publication of the design-time flow plan, a flow plan builder API coverts (e.g., compiles) the stored data model and generates a run-time flow plan that the development platform's flow engine executes.

Referring to the flow plan execution phase, in one embodiment, the development platform's flow engine executes run-time flow plans that are directed to acyclic graphs of operations that move data between operation nodes in a declarative manner as each operation completes. If the operation is associated with the wait step configured via the wait timer setting module, the flow engine puts system resources to sleep and pauses the flow the specified length of time without holding up a thread. Each operation node in the run-time flow plan may have data signatures defining input and output values. Input values may be fixed values (e.g., hard coded to specific values), registered as an observer of a previous operation node, left unassigned, or a combination thereof. Operation nodes may also be registered as a descendent of a previous node. A flow engine executes an operation node once the operation node's input values have been supplied and once, if any, of the operation node's ancestor operation nodes have completed successfully. In one embodiment, operations can be written in Java® by extending a base operation class, where the contract is to implement a run method and declare data signatures. The flow engine can opaquely execute the operations within the flow plan and propagate data values based on the execution of the operations. Operations can also be synchronous by design and can be configured to execute in a single and/or multiple threads.

Additionally, a computing device associated with client network 102, such as a MID server 107, can execute at least a portion of the run-time flow plan. In this embodiment, the flow plan development platform includes a second flow engine located on the MID server 107. The flow plan development platform may be able to offload the execution of the run-time flow plan to MID server 107 in situations where the client instance is unable to perform certain operations within the flow plan and/or would require too much computational resources. For example, the flow plan development platform may offload portions of the flow plan to MID server 107 in order to obtain data and/or transfer data to other server instances 112 that the client instance does not have permission to access. Utilizing a flow engine on a MID server is described in more detail with reference to FIG. 3.

The flow plan development platform of the client instance can create, modify, manage and execute flow plans that implement timer action elements and support a broad-range of uses cases pertaining to automating enterprise, IT, and/or other organization-related functions. The aPaaS platform may also be able to accommodate different user personas, such as IT workers and process-orientated programmers to non-IT line of enterprise customers. For example, one use case involves creating and executing a flow plan pertaining to updating a record on the Incident table by being marked as "Resolved." In this use case, a user may design the flow plan's trigger element to be activated when a record is updated on the Incident table by being marked "Complete" or "Resolved" by updating an appropriate field on the incident form. (In case of a sub-flow, the trigger element may be a script or enterprise rule that calls the sub-flow's API in response to the same trigger, i.e., updating of a record on the Incident table by being marked "Complete" or "Resolved"). In response to the trigger element (for flow or sub-flow) being activated, the corresponding set of actions defined in the flow plan may be executed. For example, a first action may be a wait step of pausing execution of the particular instantiation of the run-time flow plan corresponding to the particular triggering record of the Incident table for a specified length of time (e.g., 2 weeks). The flow plan may then execute a second action to automatically mark the particular incident record as "Closed", if there has been no activity on the particular incident record during the 2-week wait duration. Thus, in this exemplary use case, by implementing the feature of the timer action element in the design-time flow plan, the incident can automatically be marked "Closed" after a predetermined period of time has passed, without a user having to manually identify and close old incidents. The flow plan may also then execute a third action to, for example, automatically send to the user corresponding to the particular incident record, a "Customer Satisfaction Survey", prompting the user to provide feedback on the user's experience in connection with resolution of the incident. The flow plan may further execute a fourth action to automatically store the user's response (if any) to the survey in association with the particular incident record.

Another example use case may involve integrations between remote systems like an API management point. A wait step may be incorporated in a flow plan pertaining to instructing an external system to perform an action. The flow engine may utilize the wait step corresponding to the timer action element to pause the flow while waiting for the external system to complete execution of the instructed action. The flow engine may then periodically ping the external system to obtain status of the action request, and the rehydrate a run-time flow plan and allocate threads once the external action is reported as complete. This way, holding up threads while waiting on external systems is avoided, thereby making the threads available for other executions.

Figure 2:
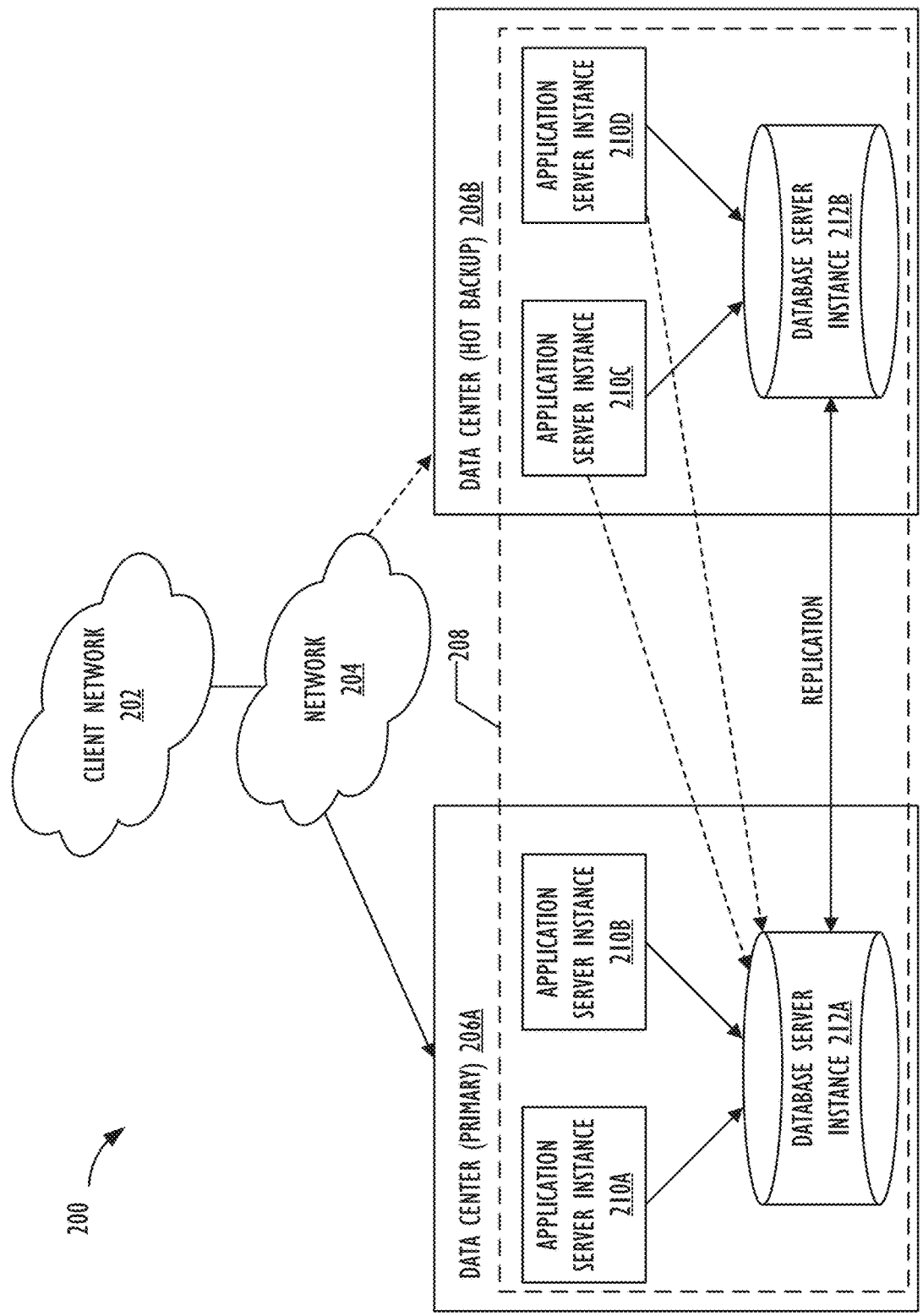
FIG. 2 is a schematic diagram of an embodiment of a multi-instance cloud architecture where embodiments of the present disclosure may operate.

In one embodiment, utilizing a multi-instance cloud architecture, a first client instance may be configured with a client side application interface such as, for example, a web browser executing on a client device (e.g., one of client devices 104A-E of FIG. 1). FIG. 2 illustrates a block diagram of an embodiment of a multi-instance cloud architecture 200 where embodiments of the present disclosure may operate. FIG. 2 illustrates that the multi-instance cloud architecture 200 includes a client network 202 that connects to two data centers 206A and 206B via network 204. Client network 202 and network 204 may be substantially similar to client network 102 and network 108 as described in FIG. 1, respectively. Data centers 206A and 206B can correspond to FIG. 1's data centers 112 located within cloud resources platform/network 110 (e.g., aPaaS platform/network). Using FIG. 2 as an example, a client instance 208 is composed of four dedicated application server instances 210A-210D and two dedicated database server instances 212A and 212B. Stated another way, the application server instances 210A-210D and database server instances 212A and 212B are not shared with other client instances 208. Other embodiments of multi-instance cloud architecture 200 could include other types of dedicated server instances, such as a web server instance. For example, client instance 208 could include the four dedicated application server instances 210A-210D, two dedicated database server instances 212A and 212B, and four dedicated web server instances (not shown in FIG. 2).

To facilitate higher availability of client instance 208, application server instances 210A-210D and database server instances 212A and 212B are shown to be allocated to two different data centers 206A and 206B, where one of data centers 206 may act as a backup data center. In reference to FIG. 2, data center 206A acts as a primary data center that includes a primary pair of application server instances 210A and 210B and primary database server instance 212A for client instance 208, and data center 206B acts as a secondary data center to back up primary data center 206A for client instance 208. To back up primary data center 206A for client instance 208, secondary data center 206B includes a secondary pair of application server instances 210C and 210D and a secondary database server instance 212B. Primary database server instance 212A is able to replicate data to secondary database server instance 212B. As shown in FIG. 2, primary database server instance 212A replicates data to secondary database server instance 212B using a replication operation such as, for example, a Master-Master MySQL Binlog replication operation. The replication of data between data centers could be implemented in real time or by implementing full backup weekly and daily incremental backups in both data centers 206A and 206B. Having both a primary data center 206A and secondary data center 206B allows data traffic that typically travels to the primary data center 206A for client instance 208 to be diverted to secondary data center 206B during a failure and/or maintenance scenario. Using FIG. 2 as an example, if application server instances 210A and 210B and/or primary data server instance 212A fail and/or are under maintenance, data traffic for client instance 208 can be diverted to secondary application server instances 210C and 210D and secondary database server instance 212B for processing.

Although FIGS. 1 and 2 illustrate specific embodiments of cloud computing system 100 and multi-instance cloud architecture 200, respectively, the disclosure is not limited to the specific embodiments illustrated in FIGS. 1 and 2. For instance, although FIG. 1 illustrates that cloud resources platform/network 110 is implemented using data centers, other embodiments of the cloud resources platform/network 110 are not limited to data centers and can utilize other types of remote network infrastructures. Moreover, other embodiments of the present disclosure may combine one or more different server instances into a single server instance. Using FIG. 2 as an example, application server instances 210 and database server instances 212 can be combined into a single server instance. The use and discussion of FIGS. 1 and 2 are only exemplary to facilitate ease of description and explanation.

Figure 3:
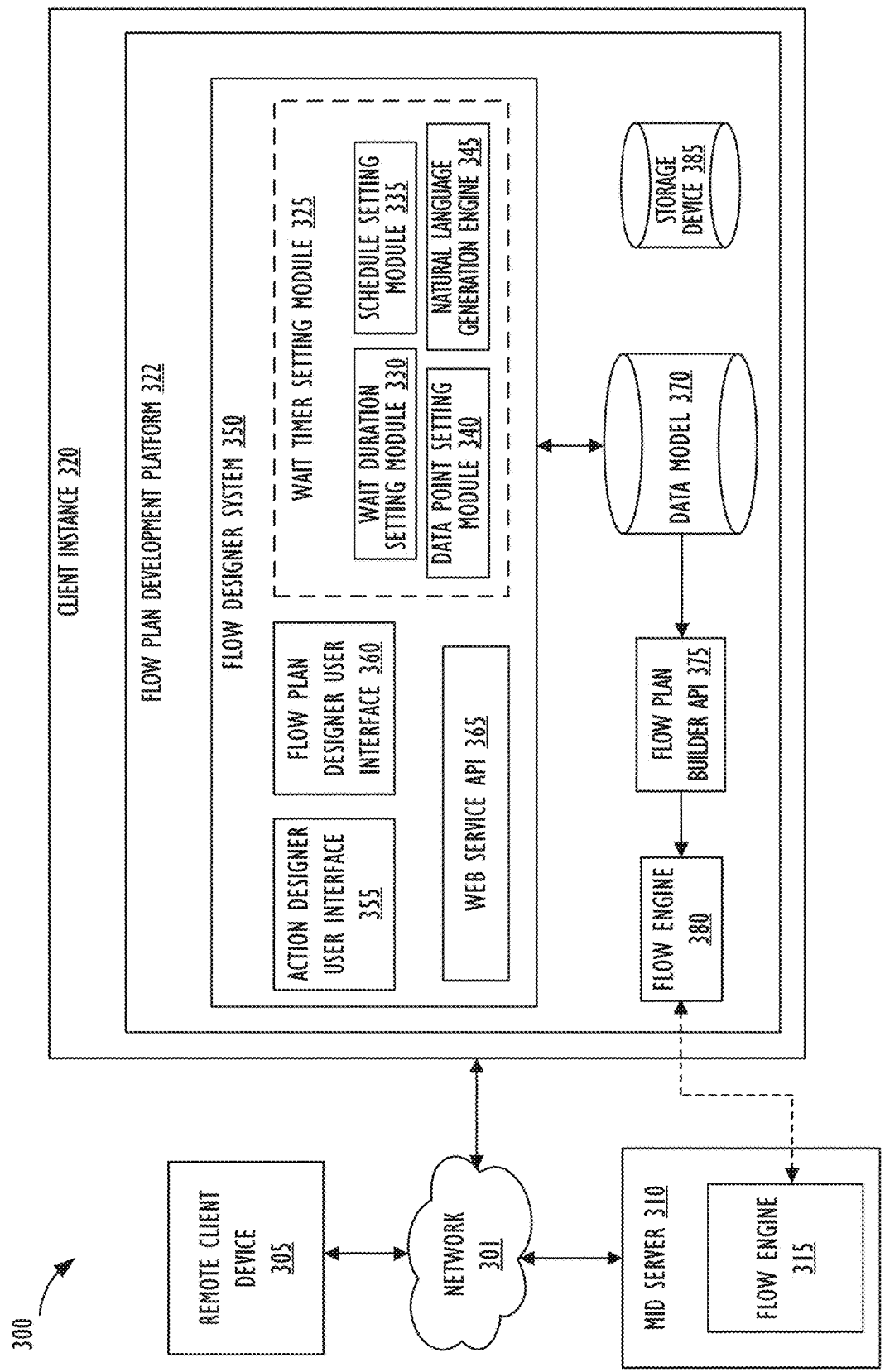
FIG. 3 is a block diagram of an embodiment of a cloud-based application platform as a service (aPaaS) platform for creating, modifying, managing, and executing a flow plan that implements a timer action element to pause a flow of actions for a specified duration of time.

FIG. 3 illustrates a block diagram of cloud computing system 300 where one or more embodiments of the present disclosure may operate. As shown in FIG. 3, cloud computing system 300 may include remote client device 305 and client instance 320 that are communicatively coupled to each other through network 301. Although not shown in FIG. 3, client instance 320 may be provided on an aPaaS platform that is similar to cloud resources platform/network 110 shown in FIG. 1, and that includes one or more client instances 320. Remote client device 305 may be substantially similar to any of client devices 104A-E, as described in FIG. 1. Network 301 may be substantially similar to any of client network 102 and/or network 108, as described in FIG. 1. Detailed description of remote client device 305 and network 301 is omitted here. Client instance 320 may be substantially similar to client instance 208, as described in FIG. 2. Client instance 320 may be hosted on cloud resources platform/network 110, as described in FIG. 1, and may be accessible by a user of remote client device 305 via network 301 through an application interface such as, for example, a graphical user interface (GUI) or a web browser executing on remote client device 305, in order to access software applications, services, and data deployed on client instance 320.

Client instance 320 may include flow plan development platform 322 for creating, modifying, managing, and executing flow plans (flows or sub-flows) that implement timer action elements in a low code/no code, natural language process automation environment on the aPaaS platform. Flow plan development platform 322 may include flow designer system 350, data model 370, flow plan builder API 375, flow engine 380, and storage device 385. Although FIG. 3 shows storage device 385 as being part of flow plan development platform 322, this may not necessarily be the case. For example, storage device 385 may alternately (or additionally) be provided external to flow plan development platform 322, elsewhere on client instance 320. As another example, storage device 385 may be alternately (or additionally) provided on the aPaaS platform, external to client instance 320.

Client instance 320 may act as a hosted client instance platform for deploying various enterprise and/or IT related software applications and related enterprise data on a relational database. The enterprise data may be stored in storage device 385 and may correspond to data of a plurality of rows (or records) of a plurality of tables of the database. The database may be updated in real-time as a user interacts with (e.g., insert, update, delete a record in a table) client instance 320. The software applications hosted on client instance 320 may provide coverage in one or more capability areas of the enterprise such as IT, IT support, security, customer service, technical support, e-mail, backup and storage, HR, finance, legal, marketing, sales, compliance, and governance. For example, the software applications may include components related to the following applications and modules of the enterprise: IT Service Management, Incident Management, Problem Management, Change and Release Management, Benchmarks, Cost Management, Request Management, Configuration Management Database, Asset Management, Service Catalog, Knowledge Management, Survey and Assessment, Service Level Management, IT Operations Management, Discovery, Cloud Management, Event Management, Orchestration, Service Mapping, Operational Intelligence, IT Business Management, Project Portfolio Management, Demand Management, Resource Management, Agile Development, Application Portfolio Management, Cost Transparency, Financial Planning, Financial Reporting, Performance Analytics, Software Asset Management, Security, Security Operations, Governance, Risk and Compliance, Customer Service, Customer Service Management, Field Service Management, Knowledge Management, HR Service Delivery, Case and Knowledge Management, Employee Service Center, Employee Onboarding and Transitions.

Flow plan development platform 322 of client instance 320 may separate out the user experience in creating the design-time flow plan from the run-time considerations of storing and executing the corresponding run-time flow plan. Unlike a scripting tool that may be available on client instance 320 where a user creating an automated process (flow plan) may be required to drop into script for advanced configurations for trigger elements (e.g., activated by a CRUD operation on a record on a predetermined table, inbound REST API call to a sub-flow, and the like), and action elements (e.g., logic to incorporate a wait step), flow plan development platform 322 uses flow designer system 350 that allows the user to create, modify, and manage flow plans implementing timer action elements in a low code/no code, natural language process automation environment, without having to drop into script. This interactive, easy-to-use, "drag and drop" user interface may allow even non-IT users with little or no programming knowledge to effortlessly configure and setup flow plans that implement complex process logic.

In particular, flow plan development platform 322 uses flow designer system 350 to create the design-time flow plan using database structures, and flow engines 380 and 315 are configured to have no knowledge of the database structure of the design-time flow plans and/or actions (e.g., timer action elements) designed with flow designer system 350. In FIG. 3, although flow engine 315 is shown as a component outside of flow plan development platform 322, flow engine 315 may be considered to be a logical component that is part of flow plan development platform 322, and that operates in conjunction with flow engine 380 to execute flows or sub-flows on client instance 320. Flow engines 380 and 315 may execute a run-time version of the design-time flow plan, which in one embodiment are compiled JSON documents built via flow plan builder API 375. Client devices, such as client devices 104A-C shown in FIG. 1, and remote client device 305 shown in FIG. 3, are able to call flow plan builder API 375 to construct the JSON documents and may not need to adhere to any specific rules about how, where, or even whether, to store definitions within the JSON documents. Additionally, by having the database representation of the design-time flow plan separate from the run-time flow plan, flow engine 315 can be implemented on MID server 310 using the same engine code base as being executed on a server instance. MID server 310 in FIG. 3 may be similar to MID server 107 of FIG. 1. The run-time flow plan is constructed from operations with data dependencies between each of the operations. Flow engines 380 and 315 may be able to execute the operation such that the data dependencies are met along with any explicit execution order dependencies. The details of how any given operation performs or executes its functions are abstracted away from flow engines 380 and 315.

In one embodiment, flow designer system 350 may be implemented using a Java®-based client device that would construct the design-time flow plan that implements the timer action element and request flow engines 380 and/or 315 to run the design-time flow plan. The user could build a series of actions (e.g., including timer action element) and variable bindings and chain them together into a design-time flow plan. How the user constructs the design-time flow plan can be entirely up to the user. For example, a design-time flow plan can be metadata driven or it can be hard-coded. Once flow plan development platform 322 constructs and generates the design-time flow plan, the user can choose to save it for future execution, or simply pass the design-time flow plan to flow engines 380 and/or 315 for immediate execution. For purposes of this disclosure, flow designer system 350 can also be generally referred to as and may be considered synonymous with the term "flow designer."

Creating a flow plan may involve defining what and how the flow plan performs an automated process or function (e.g., mark a record as "Closed" after pausing execution for a specified length of time, record watching on records that don't yet exist, escalating a record to higher priority if not assigned within a predetermined amount of time, and the like). To create a flow plan, flow designer system 350 may include flow plan designer user interface 360, action designer user interface 355, and wait timer setting module 325. In one embodiment, flow plan designer user interface 360 and action designer user interface 355 may be located on a client device that receives user input. Flow plan designer user interface 360 presents to a user actions (e.g., various types of action elements including timer action elements), triggers (e.g., trigger elements), and input/output element to construct design-time flow plans or sub-flow plans. A user may be able to create the design-time flow plan based on employing a general pattern of when one or more specified conditions or events occur, perform one or more actions (e.g., action elements). In other words, a user can create a design-time flow plan via flow plan designer user interface 360 and wait timer setting module 325 by specifying one or more triggers (e.g., trigger elements) for a design-time flow plan and one or more actions (e.g., timer action elements) that follow in response to the triggers. In case of a sub-flow, the user can, via flow plan designer user interface 360 and wait timer setting module 325, specify one or more input/output elements (e.g., associated tables and data points) for the sub-flow plan and one or more actions (e.g., timer action elements), and set up a script, enterprise rule, UI action, or any other logic anywhere on the aPaaS environment (inside or outside flow designer) that calls the sub-flow's REST API when one or more predetermined computing conditions (e.g., CRUD operation on a record in a table, network connection failure, and the like) are satisfied (e.g., trigger element).

Action designer user interface 355 allows the user to construct customizable actions (e.g., action elements) using action steps that can then be incorporated within the design-time flow plan. Each action within the design-time flow plan can include one or more action steps. In one embodiment, each action step includes a configured action step template that specifies the operation to perform, defines the input and output data signatures for the action step, and what data values to pass to other action steps in the design-time flow plan. The input signatures for the action step can be a fixed value, registered as an observer of one of a previous action step's output, left unset, or combinations thereof. The action step may provide the input signature to the operation to produce an output data signature. The action step can then be configured to pass the output data signature to one or more other actions steps within the same action and/or other actions (e.g., timer action element) within the design-time flow plan.

FIG. 3 also depicts that flow designer system 350 includes web service API 365, such as a REST API, to interface with a configuration management database (CMDB) that creates data model 370 representative of the design-time flow plan. As flow plan designer user interface 360, action designer user interface 355, and wait timer setting module 325 receive user inputs relating to creation of the design-time flow plan (which may implement the timer action element), flow plan designer user interface 360 and/or action designer user interface 355 may call web service API 365, which may also be part of flow designer system 350, to drive data model 370 for the design-time flow plan. The data model 370 acts as a database structure that defines the design-time flow plan as a user continuously modifies the design-time flow plan. In one embodiment, once a user is done modifying the design-time flow plan, the user via flow plan designer user interface 360 and/or the action designer user interface 355 can save the design-time flow plan for later execution or provide instructions to publish or activate the design-time flow plan for execution when trigger conditions (e.g., trigger element) are met.

When the user provides instructions to publish or activate the design-time flow plan, data model 370 goes through a compilation process by calling flow plan builder API 375. For purposes of this disclosure, flow plan builder API 375 can also be generally referred to as "flow plan builder." In one embodiment, flow plan development platform 322 provides flow plan builder API 375 to convert the design-time flow plan represented by data model 370 into a run-time flow plan, for example, a JSON document. In particular, flow plan builder API 375 provides a structure to add action steps to actions elements (e.g., including timer action element) and action elements to the flow plan or sub-flow plan. Each action step or action element within the created flow plan has an input and output signature. Inputs can be fixed values (e.g., hard coded) or set to observe a previous step or element output. For example, input and output signatures for a timer action element can be set via wait timer setting module 325. An example layout of a design-time flow plan and a run-time flow plan are shown and discussed in more detail in FIG. 7.

Design-time flow plans may not be executed by flow engines 380 and 315 until a user instructs a client device to publish or activate the design-time flow plan. In one embodiment, publishing or activating the design-time flow plan causes flow plan development platform 322 to activate the design-time flow plan by reading data model 370 using a glide-flow-service, call flow plan builder API 375 to convert (e.g., compile) data model 370, and store the generated run-time flow plan. In one embodiment, the run-time flow plan is stored as a JSON string in a trigger table. The specified type of trigger for the design-time flow plan may also determine what other records the compilation process creates to instantiate and execute an instantiation of the run-time flow plan. Flow engines 380 and 315 execute the run-time flow plan (e.g., JSON document) once one or more conditions or events occur that satisfy the trigger (e.g., trigger element of flow or sub-flow). During execution of the run-time flow plan, flow engines 380 and 315 annotate run-time state information to determine whether operations within the run-time flow plan are ready to run. An operation within a run-time flow plan is ready to run when its input values are ready and the flow engine has completed any predecessor operations.

In one embodiment, when de-serialized from JSON, the run-time flow plan is composed of OpDatum objects that hold input values and output values, operation class references, execution state, application scope, and ancestor and predecessor operation references. Flow engines 315 and 380 execute the operations as they are ready. An operation within the run-time flow may be ready when all its input values report ready and the operations predecessors have completed. To execute the operation, flow engines 315 and 380 call the execute method of the operation class. This sets the specified application scope and then calls the abstract run method. As the various run methods update the output values, registered input values' observers are automatically notified. If there are no exceptions thrown, the operation is marked as having been completed. This process continues while there are ready operations. Once flow engine 380 completes execution of the run-time flow plan, whether because flow engine 380 has completed all operations, or because flow engine 380 is waiting for a specified length of time to pause or halt the flow based on incorporation of the timer action element in the flow plan or corresponding conditions regarding timeframe or relative wait duration, or because flow engine 380 is waiting for external events, the run-time flow plan serializes into a context record to avoid holding up threads.

Flow designer system 350 may also include wait timer setting module 325 to configure settings based on user input for the timer action element of the design-time flow plan. Wait timer setting module 325 includes wait duration setting module 330, schedule setting module 335, data point setting module 340, and natural language generation engine 345. When creating a design-time flow plan via flow plan designer user interface 360, a user may configure the timer action element via wait timer setting module 325 to incorporate a wait step that is of a specified length of time during execution and that meets other conditions regarding executing the wait step relative to other events or conditions, and executing the wait step during a specified timeframe corresponding to a system schedule.

The timer action element may allow the user to implement a timer, and incorporate a wait step during execution of an automated process (flow or sub-flow), without having to drop into script. Wait duration setting module 330 of wait timer setting module 325 may enable the user to specify a type of duration of the timer action element (e.g., explicit duration, relative duration). For example, the timer may be set to run for a fixed specified length of time (e.g., days, hours, minutes, and seconds) or the timer may be set to run relative to a date and time value specified by a data point set in advance by data point setting module 340. In one embodiment, data point setting module 340 allows a user to specify, when creating the design-time flow plan via flow plan designer user interface 360, a data point (e.g., field, attribute, or column) of a table associated with the design-time flow plan to cause an instantiation of the flow plan to run relative to the date and time value corresponding to the data point for a record on the table that triggered execution of the flow plan. For example, wait duration setting module 330 and data point setting module 340 may enable the user to create a timer action element that pauses the flow at run-time for the specified length of time before or after arrival of the date and time corresponding to the data point specified by data point setting module 340 for the record that triggered the execution.

Further, schedule setting module 335 allows the user to choose, when creating or modifying the design-time flow plan via flow plan designer user interface 360, a timeframe (e.g., recurring or predetermined window of time) or system schedule during which the timer is configured to run within the run-time flow plan. For example, schedule setting module 335 may allow the user to specify a timeframe so that the wait step of the timer action element only runs during the window of time (e.g., 8 am-5 pm on Weekdays) specified by the timeframe. By setting the specified timeframe via schedule setting module 335, the operation of the run-time flow plan corresponding to the timer action element to execute the wait step for the specified length of time can be controlled to pause the flow only during the specified window of time of the timeframe. For example, if the timeframe ends while the timer is still running the wait step, flow engine 380 may control the operation to save the context record corresponding to the partially-run timer, and halt execution of the run-time flow plan so as to avoid holding up threads. Flow engine 380 may then resume execution of the run-time flow plan and finish the partially run-timer based on the saved context record when the current standard time (e.g., system time) is determined to be within the specified timeframe again.

Natural language generation engine 345 may generate a natural language annotation that reflects the specified wait duration set by wait duration setting module 330, specified data point set by data point setting module 340, and specified timeframe set by schedule setting module 335 in a human-readable format for presenting the natural language annotation to the user in association with the timer action element in the design-time flow plan, via flow plan designer user interface 360. As a result, a user creating, managing, modifying or executing the design-time flow plan can quickly ascertain configuration information of the timer action element in the design-time flow plan simply by reviewing the human-readable natural language annotation generated by natural language generation engine 345. As a result, even a non-programmer user can easily and quickly ascertain configuration of the timer action element without having any knowledge about intricacies of the flow designer. Wait timer setting module 325 may be created using any suitable programming language (e.g., Java®) and database management system including one or more relational database tables. Data associated with wait timer setting module 325 (e.g., selectable schedules, data points, and the like) may be stored in storage device 385. Configuring a timer action element in the design-time flow plan via flow plan designer user interface 360 and wait timer setting module 325 is explained in further detail below in connection with FIGS. 4-6.

Figure 4:
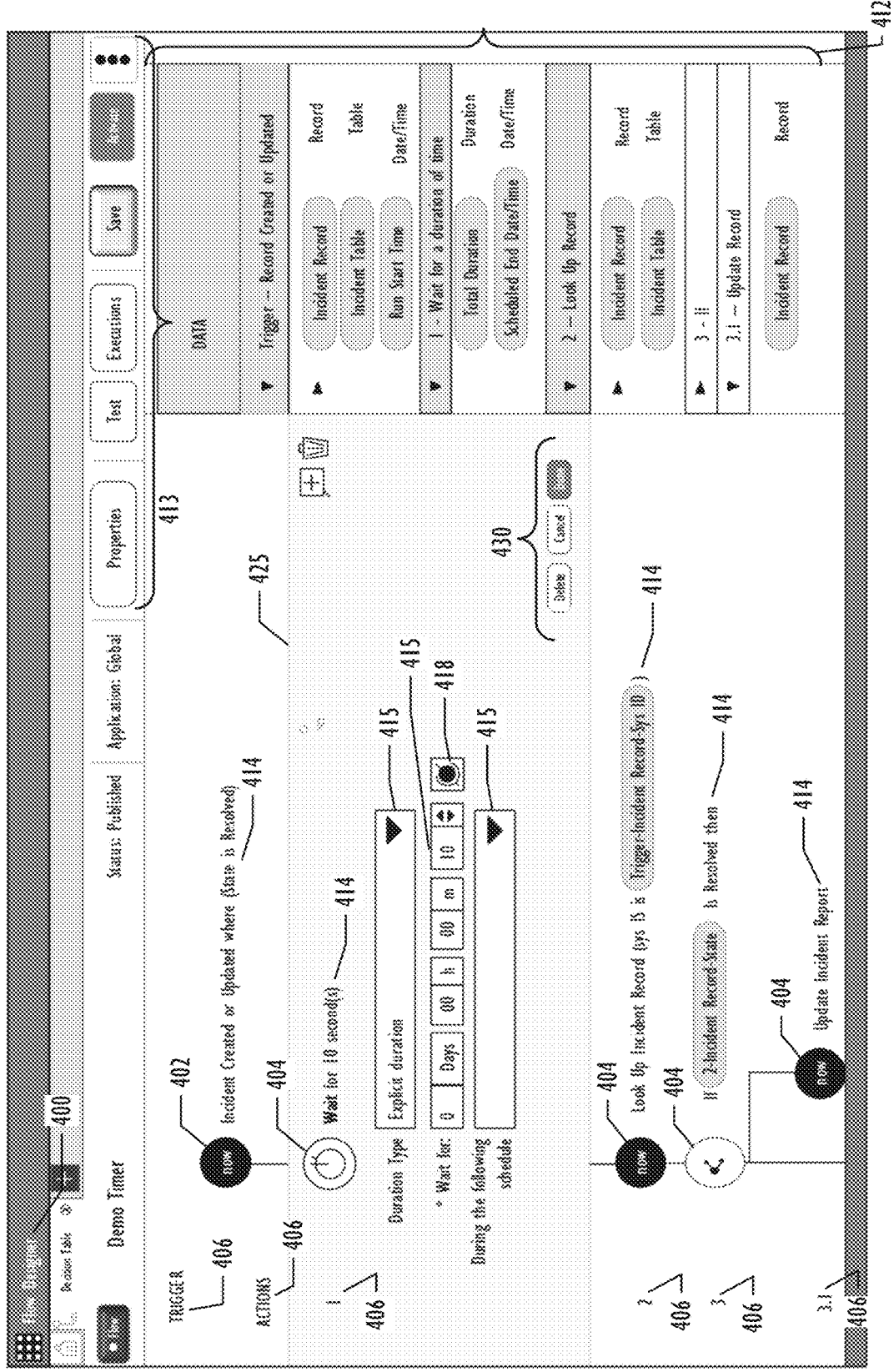
FIG. 4 illustrates an embodiment of a design-time flow plan a user can create with a flow plan designer user interface and wait timer setting module to implement a timer action element.
Figure 5:
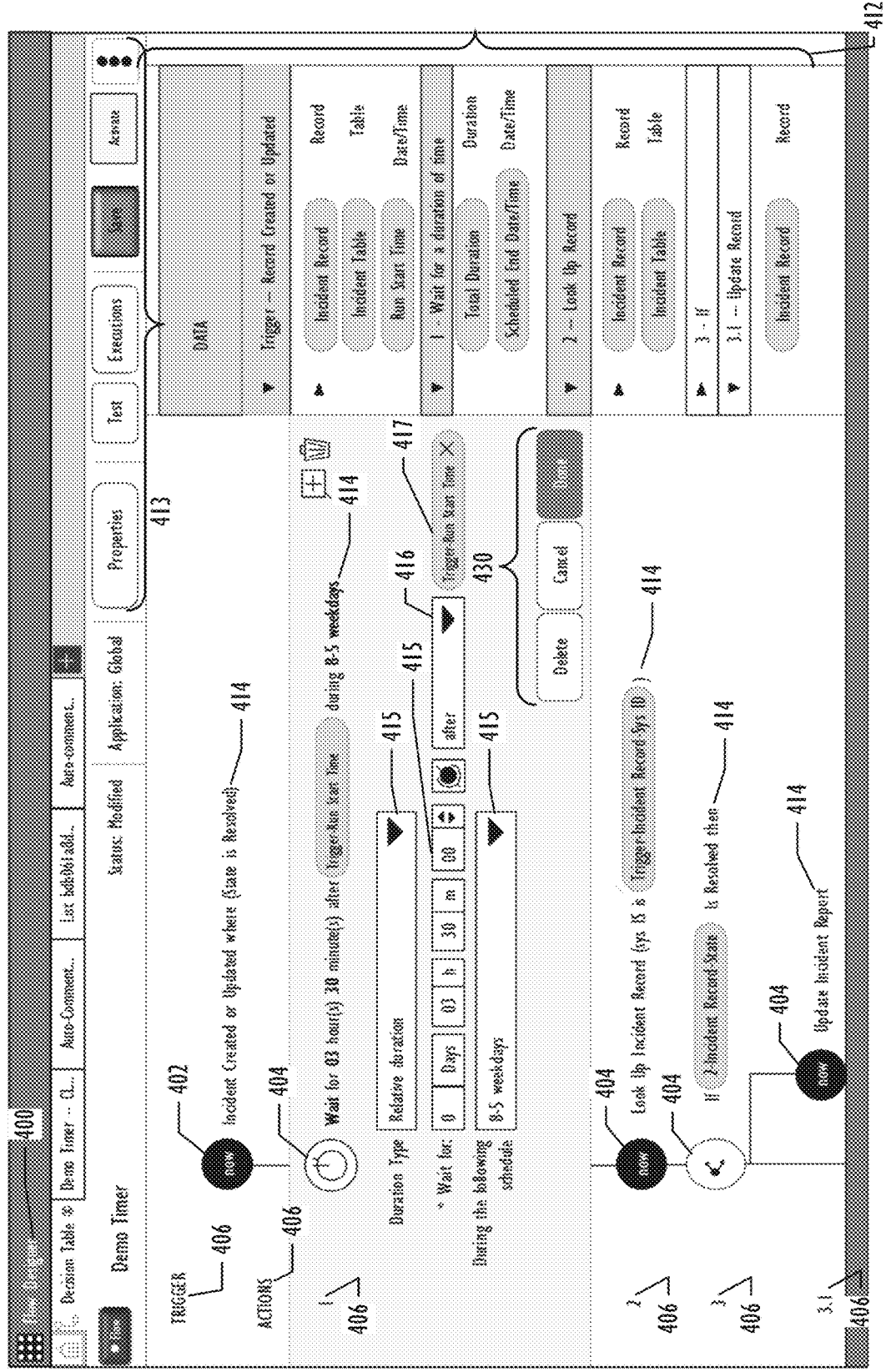
FIG. 5 illustrates another embodiment of a design-time flow plan a user can create with the flow plan designer user interface and wait timer setting module to implement a timer action element.
Figure 6:
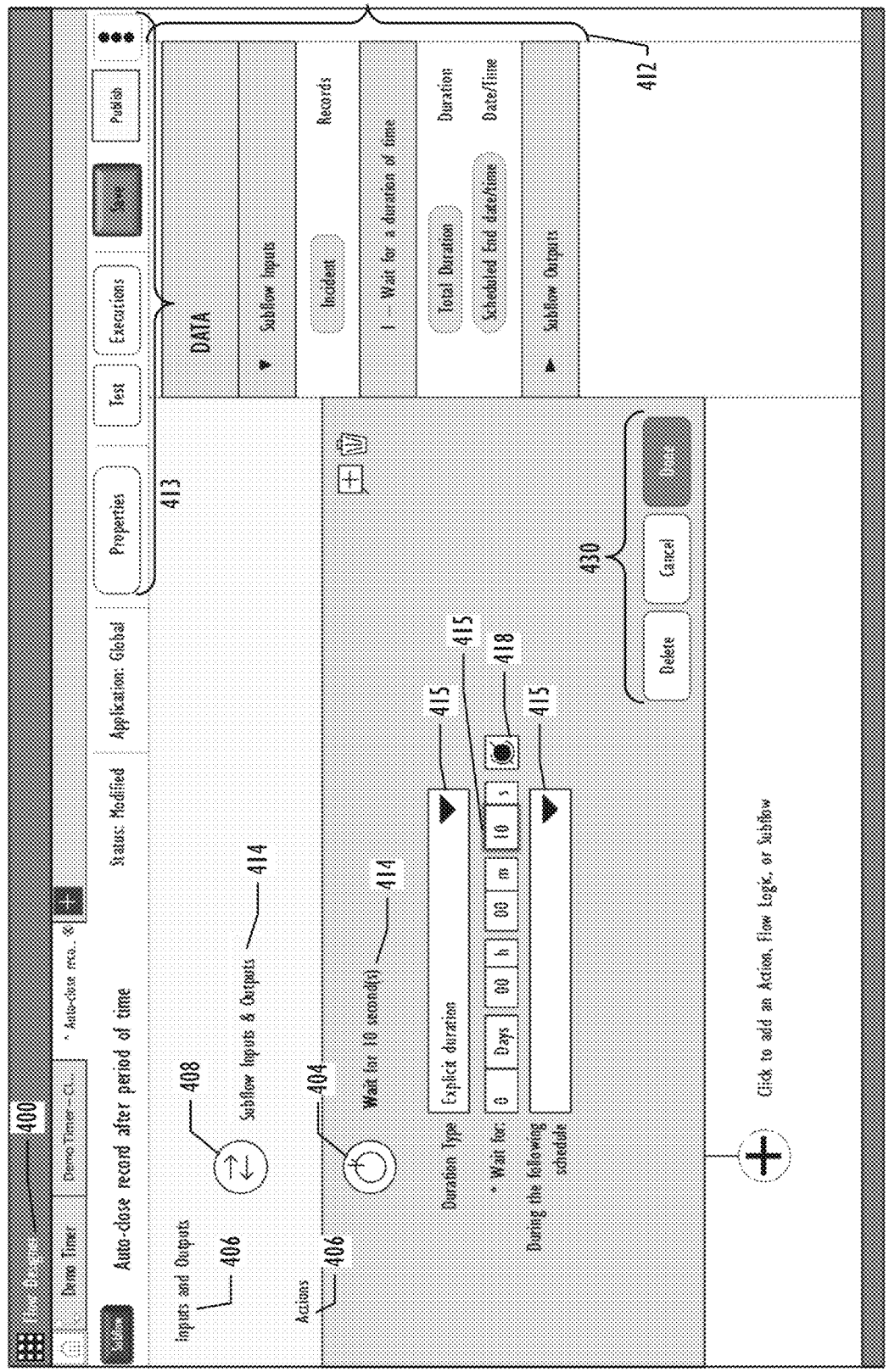
FIG. 6 illustrates an embodiment of a design-time sub-flow plan a user can create with the flow plan designer user interface and wait timer setting module to implement a timer action element.

FIGS. 4-6 illustrate embodiments of design-time flow plans (or design-time sub-flow plan in FIG. 6) that a user can create with flow plan designer user interface 400 (or flow plan designer user interface 360 of FIG. 3). As shown in FIGS. 4-6, flow plan designer user interface 400 permits a user to create, modify, manage, and execute a human-readable version of the design-time flow plan that implements the timer action element. In particular, as shown in FIGS. 4-5, flow plan designer user interface 400 presents trigger indicator 402 to represent the design-time flow plan's trigger element, and presents action indicators 404 to represent the design-time flow plan's action elements (e.g., including timer action element). In one embodiment, by interacting with flow plan designer user interface 400, the user configuring the design-time flow plan can set trigger indicator 402 by selecting a trigger element from a guide window of pre-existing trigger elements presented to the user. As explained previously, the trigger element may be defined so as to fire based on a CRUD operation or query operation of a record in a particular specified table, expiration of a timer, arrival of an inbound REST API call, and the like. In the example shown in FIG. 4, the trigger element fires when an incident is created or updated on the Incident table where the state is "Resolved". Further, by interacting with flow plan designer user interface 400, the user configuring the design-time flow plan can set one or more action indicators 404 by selecting one or more action elements from a guide window of pre-existing action elements presented to the user for selection. Thus, the design-time flow plan can be created from pre-existing or copied action elements (e.g., timer action elements). In one or more embodiments, the pre-existing action elements may correspond to third party or external action elements that the automation system of the flow plan development platform may call to complete certain functions (e.g., posting a message on Microsoft® Teams; sending a Slack message, and the like). Alternately, the pre-existing action elements may correspond to operations with an internal application (e.g., logging an event, sending email, looking up a record in a table, updating a record in a table, and the like). The timer action element may be a pre-existing action element that the user can select from the guide window to add as an action to the design-time flow plan (flow or sub-flow).

As shown in FIG. 6, flow plan designer user interface 400 also permits a user to create, modify, manage, and execute a human-readable version of the design-time sub-flow plan that implements the timer action element. In particular, as shown in FIG. 6, flow plan designer user interface 400 presents input/output indicators 408 to represent the design-time sub-flow plan's input/output elements, and presents action indicator 404 to represent the design-time sub-flow plan's action elements (e.g., including timer action element). In one embodiment, by interacting with flow plan designer user interface 400, the user configuring the design-time sub-flow plan can set input/output indicators 408 by selecting input/output elements from a guide window of pre-existing input/output elements presented to the user. As explained previously, the input/output elements may be data points of a table associated with the design-time sub-flow plan and selected by a user that may be available for use in subsequent actions of the design-time sub-flow plan. The sub-flow may then be executed by calling the sub-flow's API from anywhere on the aPaaS platform in response to a trigger element (e.g., UI action, CRUD operation on a record in a table, and the like) defined elsewhere.

As shown in FIG. 4-6, the user can interact with flow plan designer user interface 400 to set a action indicator 404 of the timer action element. That is, when creating or modifying a design-time flow plan (or design-time sub-flow plan), flow plan designer user interface 400 may allow a user to select as an action indicator 404, a timer action indicator (represented by a graphic icon having a watch dial) 404 that corresponds to the timer action element and acts as an mechanism for the design-time flow plan to implement a timer action element configured by wait timer setting module 325. As shown in FIG. 4-6, when the user interacts with flow plan designer user interface 400 to select as action indicator 404, a timer action indicator corresponding to the timer action element, flow plan designer user interface 400 may present selection window 425 to the user to input one or more attributes 415 pertaining to the timer action element. Attributes 415 that may be input by the user in selection window 425 may include selection of a duration type (e.g., explicit duration or relative duration) indicating whether the wait is for a fixed specified length of time (FIG. 4) or whether the wait is relative to a specified data point (FIG. 5); selection of a wait duration (e.g., length of time measured in days, hours, minutes, and seconds); and selection of a specified timeframe or system schedule indicating a window of time during which the timer is to run for pausing the flow (e.g., 8 am-5 pm Weekdays, 8 am-5 pm Weekdays excluding holidays, Blackout days, retail hours, freeze times, and the like).

As shown in FIG. 5, flow plan designer user interface 400 may also present in selection window 425, relative duration attributes 416 and 417 pertaining to the timer action element in case the user selects the duration type as Relative duration. That is, for example, if the duration type attribute 415 in selection window 425 is selectively set by the user to Relative duration, flow plan designer user interface 400 and wait timer setting module 325 may present to the user relative duration attributes 416 and 417 for selection of a data point of a table associated with the design-time flow plan relative to which the timer is to run. For example, in the embodiment shown in FIG. 5, the timer action element represented by timer action indicator 404 is configured to pause execution of the flow (wait) for 3 hours and 30 minutes during the specified timeframe of "8-5 Weekdays", relative to the date and time specified by the "RunStartTime" data point of the record on the Incident table that triggered the current execution. That is, at run-time, attributes 416 and 417 specified by the user configure the timer to start running (waiting) after (attribute 416) the date and time specified by attribute 417 exceeds the current or system standard time. In one embodiment, flow plan designer user interface 400 may, in selection window 425, include a plurality of user-selectable data points that can be selected form a drop-down list by operating pill picker 418, and set as attribute 417 for setting the relative wait duration. The user can then browse the list of data points available for configuring the timer action element and pick a data point to customizably set the relative execution start time of the wait step during execution of the flow plan. Alternately, flow plan designer user interface 400 allows data point for attribute 417 to be set via a "drag and drop" experience by enabling dragging of the appropriate column or data point from data panel component 412 that lists available data points for the design-time flow plan. In this way, in the example embodiment shown in FIG. 5, the user can select the "RunStartTime" data point of the Incident table record that triggered the design-time flow plan of FIG. 5 as attribute 417. Then, during run-time, for example, when an incident record is updated in the Incident table to the "Resolved" state, date and time value for the RunStartTime field of the record is passed as input to attribute 417 by the run-time flow plan and the wait step for the specified duration is executed based on the passed input to attribute 417.

Further, as shown in, for example, FIG. 5, based on the user-selected values for attributes 415-417, natural language generation engine 345 of wait timer setting module 325 sets natural language annotation 414 (e.g., "Wait for 03 hour(s) 30 minute(s) after (Trigger→RunStartTime) during 8-5 Weekdays") that presents the set specified wait duration, timeframe, and data point in case of relative wait duration for the timer action element in a human-readable format in the design-time flow plan. Flow plan designer user interface 400 further includes operation panel 430 so that once the user is satisfied with setting attributes 415-417 (and as gleaned from natural language annotation 414) corresponding to the timer action indicator 404, the user can save the action indicator 404 as a timer action element of the design-time flow plan.

FIGS. 4-6 also illustrate that flow plan designer user interface 400 includes data panel component 412 that summarizes the arrangement and order of the design-time flow plan, and corresponding data points (e.g., field values for one or more fields, columns, or attributes of a triggering record on a table) that are available for creating the design-time flow plan. For example, in the illustrative use case shown in FIGS. 4-5, because the trigger element (corresponding to trigger indicator 402) is set to fire when a record in the "Incident" table is created or updated with the "Resolved" state, data corresponding to field values of various fields (or columns or attributes or data points) of the created or updated Incident record which activates the trigger element is available for use to the design-time flow plan. This available data listed in data panel component 412 may then be used in subsequent actions in the design-time flow plan. For example, as shown in FIG. 5, the "RunStart- Time" data point or field (storing a date and time value) of the triggering record can be used in a wait step (timer action element) to pause the flow for the specified length of time after the date and time specified by the "RunStartTime" data point becomes current (exceeds current standard or system time). The data points corresponding to the various columns or fields of the created or updated incident record are presented visually for utilization (e.g., via "drag and drop") in data panel component 412. By creating this low code/no code, natural language process automation authoring, creating complex flow plans that take sophisticated data inputs is made more user-friendly, without requiring the process developer to drop into script.

In FIGS. 4-6, each of the indicators 402, 404 and 408 may be graphical representations, such as graphics icons, where the graphic icons could differ dependent on the type of the trigger and/or action element and/or input/output element. Using FIGS. 4-5 as an example, different graphic icons can be used for action indicators 404 when the action element corresponds to a timer function, a look up record function, and an "if" function. FIGS. 4-6 also illustrate that text label 406 can be located in close proximity to the different indicators 402, 404, and 408 in order to improve readability of the design-time flow plan (or design-time sub-flow plan). As an example, in FIG. 5, text label 406 above the trigger indicator 402 presents text that specifies the trigger indicator 402 is for a trigger element and text label 406 above the first action indicator 404 (in this case, a timer action indicator) specifies that the action indicators 404 correspond to various action elements. FIGS. 4-6 also illustrate that text label 406 can present a numerical representation of an action element's order within the design-time flow plan. Flow designer user interface 400 may connect and arrange indicators 402 and 404 based on how data routes amongst the trigger and action elements. Recall, that the linking between trigger and action elements are based on what inputs an element receives from other elements and what outputs the element sends to other elements. Using FIG. 5 as an example, flow designer user interface 400 may link trigger indicator 402 to action indicator 404 (in this case, timer action element) with text label 406 that has the value of "1." Action indicator 404 may then connect to a second action indicator 404 (in this case, a look up record action element) that has text label 406 with a value of "2."

FIGS. 4-6 also illustrate that flow designer user interface 400 may include function annotations 414 that summarize functional operations for each of the indicators 402, 404 and 408 for the design-time flow plan (or sub-flow). Function annotations 414 may vary depending on the type of trigger and action elements a user creates. In case of the timer action element configured via wait timer setting module 325, as shown in FIGS. 4-6, function annotations 414 may be the natural language annotations 414 generated by natural language generation engine 345 based on user-selected values for attributes 415-417 in selection window 425 of the timer action element of the design-time flow plan. Flow designer user interface 400 may also include a menu component 413 that includes a list of functions that a user may perform on the design-time flow plan and the ability to add pre-existing or previously saved action elements within a design-time flow plan. In FIGS. 4-6, the menu component 1913 includes menu options, such as for "properties," "test," "executions," "save," and "activate," options. Other embodiments of the menu component 413 may include other operations, such as the "publish" option and/or a portion of the menu options shown in FIGS. 4-6.

FIG. 7 is an illustration that maps the relationship between a design-time flow plan 700 and a run-time flow plan 702. FIG. 7's depiction of the design-time flow plan 700 is a graphical representation of a data model prior to compilation. Recall the design-time flow plan 700 can be created using an aPaaS platform's flow designer system that drives the data model representation of the design-time flow plan 700. As shown in FIG. 7, the design-time flow plan 700 may include trigger element 704 and flow element 708. Flow element 708 includes a plurality of action elements 712 (e.g., timer action element), where each action element 712 includes action step elements 714. The action element 712 may be considered an abstraction boundary that is generally defined in domain terms and the action step elements are typically defined in application platform based specific terms, such as a script and/or create, read, update and delete (CRUD) operations on a specific data structure. Trigger element 704, action elements 712 and action step elements 714 can be customized, modified, and updated using the flow designer system. For example, a user may select when the design-time flow plan (or sub-flow plan) 700 should execute by selecting and configuring the trigger element 704.

Based on user inputs and instructions, the flow designer system is able link input values within an input signature 728 of a given element (e.g., trigger element 704, flow element 708, action elements 712, and action step elements 714) with output values within an output signature 726 of other elements and/or input values of an element located within the given element. The linking between the input values and output values create an observer and observable relationship between the different elements. For example, input values for one or more action step elements 714 located within the given action element 712 can observe a given action element's 712 input values. By linking the input values of a given element to output values of other component elements, a user is able to create a serializable run-time flow plan 702 during execution. In addition to having input values of a given element register as an observer of input values and/or output values of previous elements, the input signature of the given element register could include input values that have fixed values (e.g., hard coded), are left unset, or combinations thereof. Similar observer and observable relationships between input values and output values can also be established in case of action element 712 being a timer action element.

FIG. 7 depicts that trigger element 704 includes an output signature 726, and flow element 708, action elements 712, and action step elements 714 include both input signatures 728 and output signatures 726. Trigger element's 704 output signature 726 links to flow element's 708 input signature 728. Flow element's 708 input signature 728 then becomes action element's 712a input signature 728, which then is linked to action step element's 714a input signature 728. Action step element 714b's input signature 728 then observes action step element's 714a output signature 726. Action step 714b's output signature 726 subsequently links to action element 712a's output signature 726. Action element's 712b input signature 728 then observes action element's 712a output signature 726. In FIG. 7, input signatures 728 and output signatures 726 for action step elements 714c and 714d located within action element 712b follow a similar observer/observable relationship as described for action step elements 714a and 714b. Action element's 712b output signature 726 is then linked to the flow element's 708 output signature 726.

Once a user is done creating and/or modifying design-time flow plan (or design-time sub-flow plan) 700, a user may provide instructions to publish design-time flow plan 700 via the flow designer system. In response to receiving the publish instructions, flow plan development platform's 322 flow plan builder API 375 converts (e.g., compiles) design-time flow plan 700 to generate run-time flow plan 702. Flow plan builder API 375 provides a structure to add action step elements 714 to action elements 712 and action elements 712 to flow element 708. In one embodiment, as flow plan builder API 375 adds action step elements 714 into an action element 712, the flow plan builder API 375 coverts the action step component 714 into an OpDatum record in the run-time flow plan's 702 action 734. As the flow plan builder API 375 adds an action element 712 to the flow element 708, action element's 712 operation plans are added to flow operation 710.

FIG. 7 illustrates the resulting run-time flow plan 702 after compiling design-time flow plan 700. In FIG. 7, run-time flow plan 702 includes a trigger operation 706 and flow plan operation 710. The trigger operation 706 can include a responder that executes flow plan operation 710 stored with the trigger operation 706. Examples of types of trigger operations 706 include a record watcher trigger created to execute flow plan operation 710 for a record that meets specific conditions, scheduled triggers created to execute flow plan operation 710 periodically or once at a specific time, and REST triggers created to execute flow plan operation 710 in response to inbound REST requests. Other embodiments of design-time flow plan 700 and corresponding run-time flow plan 702 can include other types of triggers.

Flow plan operation 710 includes a serializable set of operations 716, 718, 720, 722, and 724, where each operation includes input signatures 730 and output signatures 732. As shown in FIG. 7, the flow plan operation 710 includes flow start directive operation 716 that contains the input signature 730 of the flow plan operation 710, which observes the trigger operation's output signature 732. Similarly, the flow plan operation 710 includes a flow end directive operation 724 that hosts the output signature 732 for flow plan operation 710. A flow engine that executes the flow plan operation 710 may minimize database operations within a CMDB to a read operation corresponding to flow start directive operation 716 and a write operation corresponding to flow end directive operation 724. When executing the flow plan operation 710, the flow engine can avoid other database operations within the CMDB, such as managing a global state.

Each action 734 likewise gets an action start directive operation 718 and action end directive operation 722. Recall that when creating the design-time flow plan 700, a user may map the input signatures 728 of the action elements 712 from the flow element 708 or from other action elements 712. Similarly, flow start directive operation 716, action start directive operation 718, and/or end directive operations 722 provide a structure in the flow plan operation 710 for the mapping of input signatures 730. Within an action 734, each action step operation 720 may become a single operation. The action step operation 720 may have its inputs values mapped from the action's 734 input signature, which is hosted on the action start directive operation 718, or from a predecessor action step operation 720. As shown in FIG. 7, input values within input signatures 730 may reference output values found within output signatures 732.

Although FIG. 7 illustrates specific embodiments of design-time flow plan 700 and run-time flow plan 702 that arranges actions (e.g., action element 712A and action 734) in a linear sequence, the disclosure is not limited to the specific embodiments illustrated in FIG. 7. For example, other embodiments of design-time flow plan 700 and run-time flow plan 702 could include branching, looping, and/or parallel execution semantics. For example, the design-time flow plan 700 and a run-time flow plan 702 may be configured to include dynamic mutation operations that dynamically create actions and/or operations that execute repeatable operations over sets of data and/or while a condition state exists. Moreover, the design-time flow plan 700 and a run-time flow plan 702 may be configured to include condition logic that optionally executes actions and/or operations based upon a condition state. The use and discussion of FIG. 7 is only an example to facilitate ease of description and explanation and are not intended to limit the disclosure to the specific examples.

Figure 8:
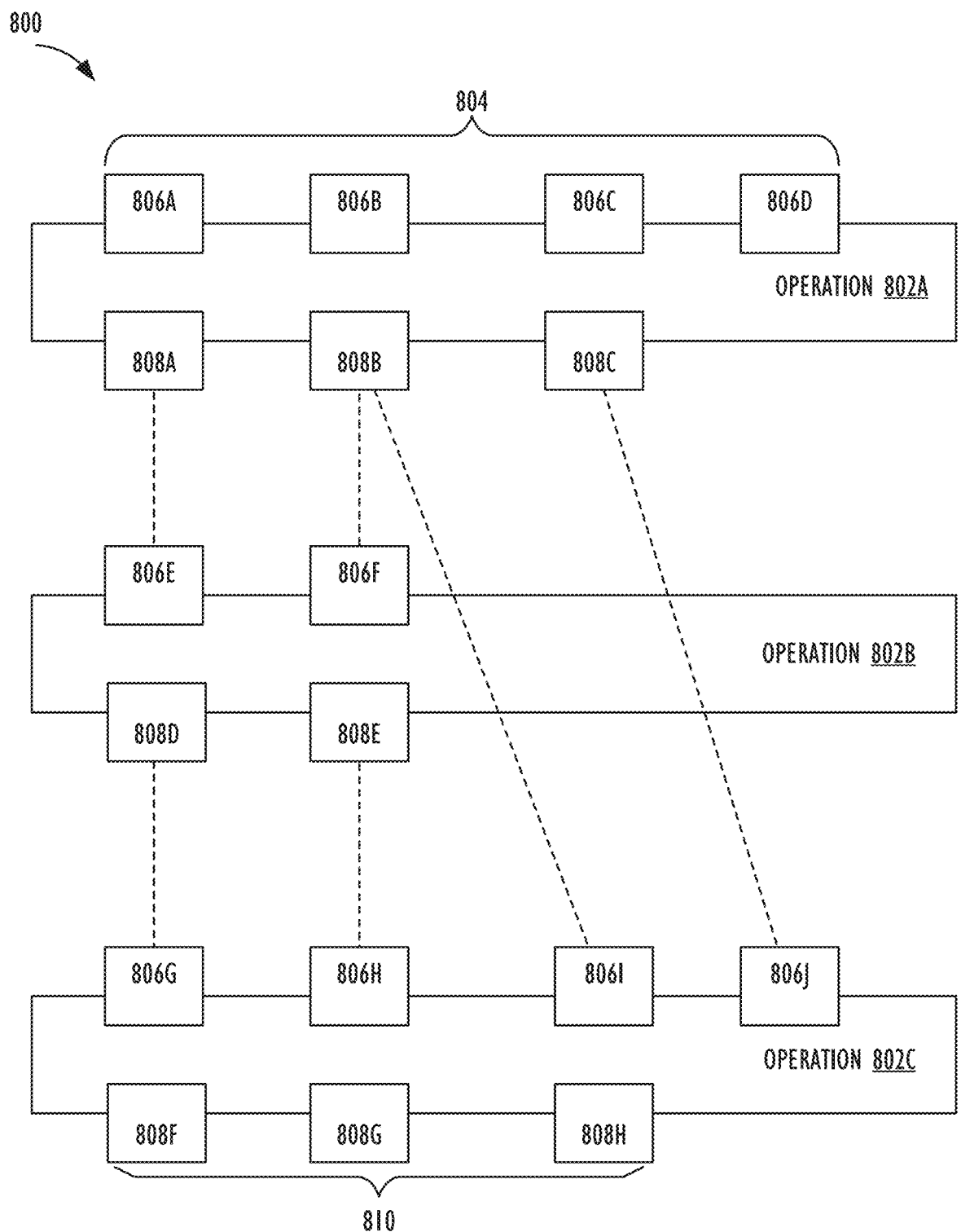
FIG. 8 illustrates a serializable set of operations that corresponds to a portion of a run-time flow plan.

FIG. 8 illustrates a serializable set of operations 802a-802c that corresponds to a portion of a run-time flow plan 800. For example and in reference to FIG. 7, operation 802a can correspond to an action start directive operation 718 and operations 802b and 802c correspond to action step operations 720. In another example and in reference to FIG. 7, operations 802a-802c could correspond to action step operations 720. FIG. 8 depicts that each operation 802a-802c in the run-time flow plan 800 has an input signature 804 and output signature 810. The input signature 804 includes input values 806a-806j and the output signatures 810 include output values 808a-808h. The input values 806a-806j and output values 808a-808h are linked together to implement a serializable, observer/observable relationship between the operations 802a-802c. As operations 802a-802c complete and populate their output values 808a-808h with data, the output values 808a-808h will notify all of its registered observer input values 806a-806j. When a flow engine queries the input values 806a-806j as to their status, the input values 806a-806j will report that they are not ready if the input values 806a-806j have not been notified of their value by their registered observable output values 808a-808h. If the input values 806a-806j have been notified, or are not observing anything, the input values 806a-806j report as ready.

As a serializable set of operations, operations 802a-802c are unable to execute until their observer input values 806 have been notified of their value and/or any predecessor operations 802 have been completed. As shown in FIG. 8, operation 802a may include an input signature 804a that includes four input values 806a-806d and an output signature 810a with three output values 808a-808c; operation 802b may include an input signature 804b that includes two input values 806e and 806f and an output signature 810b with two output values 808d and 808e; and operation 802c may include an input signature 804c that includes four input values 806g-806j and an output signature 810c with three output values 808f-808h. In response to operation 802a receiving and/or being notified of input values 806a-806d are ready, operation 802a executes to produce output values 808a-808c. Input values 806e and 806f of operation 802b observes the output values 808a and 808b, respectively, and input values 806i and 806j of operation 802c observes the output values 808b and 808c, respectively. Once operation 802a finishes execution, operation 802b's input values 806e and 806f are ready and operation 802b is then able to execute to produce the two output values 808d and 808e. The input values 806g and 806h from operation 802c observe the two output values 808d and 808e. After operation 802b executes and notifies operation 802c that input values 806g and 806h are ready and operation 802a executes and notifies operation 802c input values 806i and 806j are ready, operation 802c executes to produce output values 808f-808h.

Figure 9:
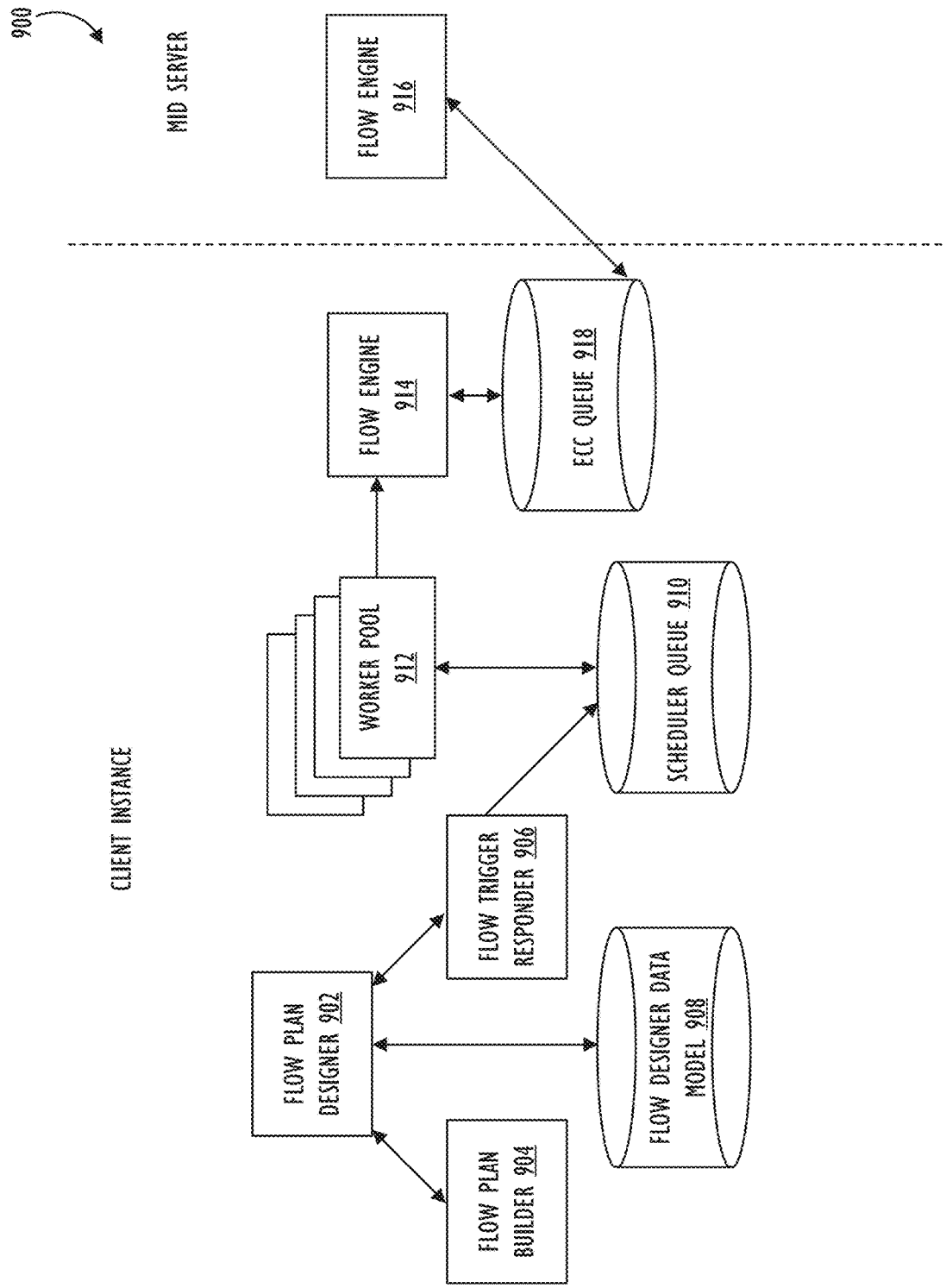
FIG. 9 is a block diagram of another embodiment of a flow designer system of the flow plan development platform for creating, modifying, managing, and executing a flow plan that implements a timer action element to pause a flow of actions for a specified wait duration.

FIG. 9 is a schematic diagram of another embodiment of flow plan development platform 900 for creating, modifying, managing, and executing flow plans that implement timer action elements. Flow plan designer 902, flow plan builder 904, and flow designer data model 908 are similar to FIG. 3's flow designer system 350, flow plan builder API 375, and data model 370, respectively. As discussed above in FIG. 3, flow plan designer 902 can include one or more user interfaces and a wait timer setting module for a user to create, customize, modify, and update a design-time flow plan that implements a timer action element. Flow plan designer 902 drives flow designer data model 908, which defines the design-time flow plan. Once a user instructs flow plan designer 902 to publish and activate the design-time flow plan, flow plan designer 902 reads (e.g., using a glide-flow-service) flow designer data model 908 and calls flow plan builder 904 to convert the design-time flow plan to a run-time flow plan. Recall that as discussed in FIG. 7, the run-time flow plan may include a trigger operation (trigger element) and a flow plan operation (corresponding to flow element (and including one or more action elements)).

Once flow plan builder 904 generates the run-time flow plan, flow plan designer 902 may send the trigger operation information associated with the run-time flow plan to a trigger responder 906. Trigger responder 906 monitors whether a computing operation satisfies one or more conditions or events specified by the trigger operation information. When the trigger responder 906 fires, the trigger responder 906 inserts a scheduled job for the run-time flow plan into a scheduler queue 910. Once the schedule job make its way through the scheduler queue 910, worker pool 912 may assign one or more existing worker threads for the flow engine 914 to execute the run-time flow plan. In one embodiment, flow engine 914 may use multiple worker threads to support execution of actions within the run-time flow plan. Having the trigger responder 906 insert a scheduled job within the scheduler queue 910 and subsequently assigning worker threads from worker pool 912 can minimize performance impact and disruption when executing the run-time flow plan. For example, the different actions (e.g., action elements) for the run-time flow plan may run asynchronously from a main thread, and thus not block the main thread when running long operations for the run-time flow plan.

FIG. 9 illustrates that a flow engine 914 and a flow engine 916 can be implemented on both client instance (e.g., client instance 320 in FIG. 3) and MID server (e.g., MID server 107 in FIG. 1), respectively. For flow engine 916 to execute an action element of a run-time flow plan on the MID server, the flow plan builder 904 generates a run-time flow plan that includes two action start directive operations and two action end directive operations. Using FIG. 7 as an example, instead of having the action 734 include a single set of an action start directive operation 718 and action end directive operation 722, the action 734 can instead include two pairs of action start directive operations 718 and action end directive operations 722. In one embodiment, the second pair of action start directive operation 718 and action end directive operation 722 may be located between the first pair of action start directive operation 818 and action end directive operation 722. When the flow engine 914 executes the first action start directive operation 718 within a run-time flow plan, the flow engine 914 propagates inputs for the second action start directive operation's 718 input signature. Once flow engine 914 propagates the input, the flow engine 914 can package all of the operations (e.g., action step operations) between the second action start directive operation 718 and action end directive operation 722 and forward the packaged operations to the External Communication Channel (ECC) queue 918. The ECC queue 918 then forwards the package operations as an ECC queue message to the MID server.

In one embodiment, the ECC queue 918 is a database table that is normally queried, updated, and inserted into by other computing system operating outside the client instance. Each record in the ECC queue 918 may be a message, either from the client instance (e.g., flow engine 914) to some other system or from the other system to the client instance. The ECC queue 918 can act as a connection point (though not the only possible one) between the client instance and other systems that integrate with it. As shown in FIG. 9, the ECC queue also acts as the connection between the customer instance and the MID server. As such, although FIG. 9 illustrates that the flow engine 916 is located on the MID server, other embodiments could have the flow engine 916 located on another remote computing system.

After MID server receives the ECC queue message, the flow engine 916 executes the received portion of the run-time flow plan. By doing so, the flow plan development platform 900 is able to offload the execution of the run-time flow plan to the MID server in situations where the client instance is unable to perform certain operations within the flow plan and/or would require too much computational resources. Once the flow engine 916 completes the execution of the received portion of the run-time flow plan, the flow engine 916 bundles and transmits its context records (e.g., run-time state information and/or other flow plan records) back to the ECC queue 918, which then forwards the received context records to the flow engine 916. Flow engine 916 may use the received context records to update the flow engine's 916 run-time state information and resume executing operations based on the received context records. When flow engine 916 is done executing the run-time flow plan, either because the flow engine 916 has completed all operations or because it is waiting for external events or because execution is paused for the specified length of time of a timer action element, the run-time flow plan serializes to a context record.

Figure 10:
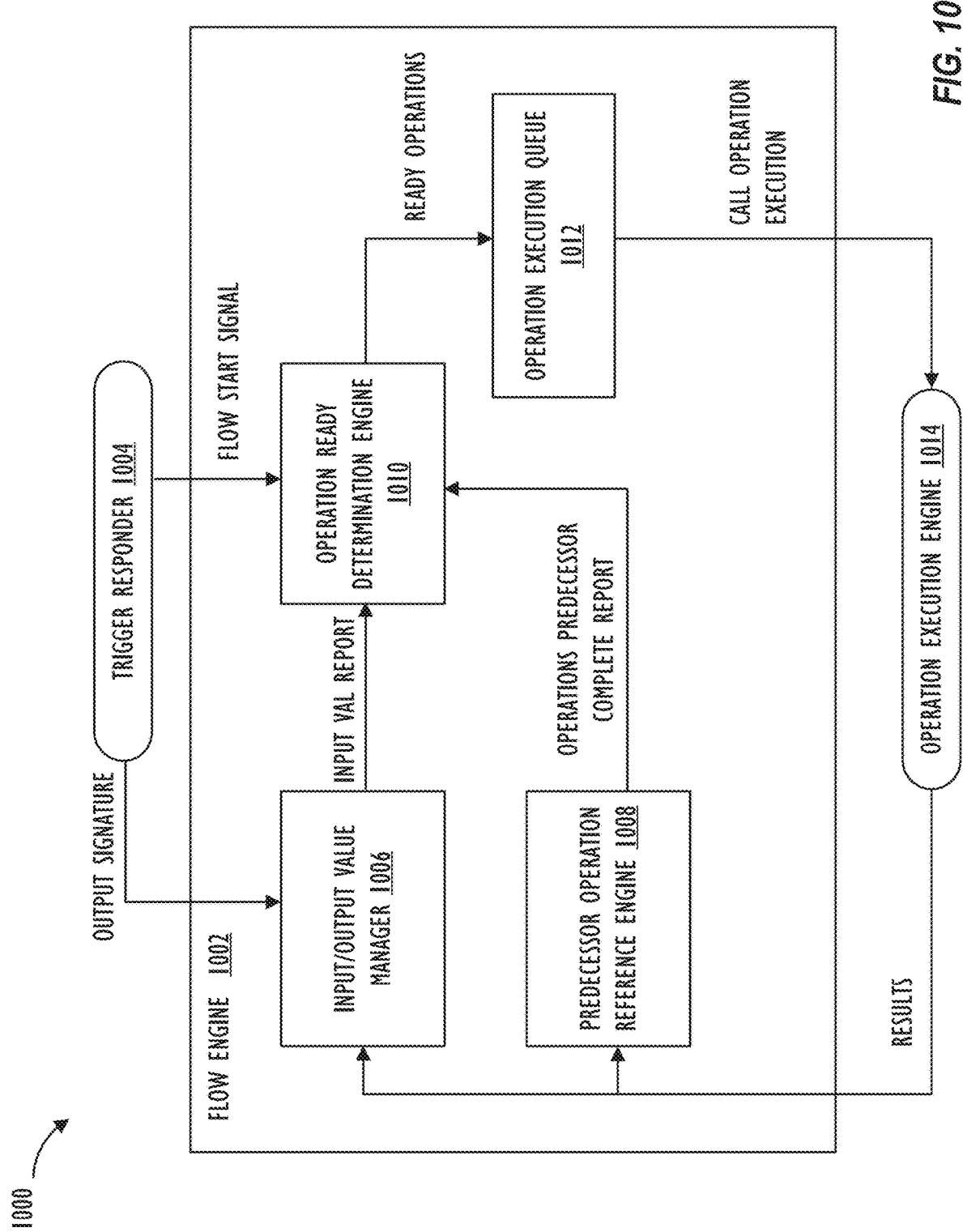
FIG. 10 is a schematic diagram of an embodiment of a flow engine for executing run-time flow plans.

FIG. 10 is a schematic diagram of an embodiment of flow engine 1002 for executing run-time flow plans. As shown in FIG. 10, trigger responder 1004, which is similar to trigger responder 906 shown in FIG. 9, detects that one or more conditions or events satisfy a trigger for a run-time flow plan. The trigger responder 1004 can send its output signature and a flow start signal to the flow engine 1002. Specifically, flow engine's 1002 input/output value manager 1006 receives the output signature from the trigger responder 1004 and the operation ready determination engine 1010 receives the flow start signal. Input/output value manager 1006 maps and manages the observer/observable relationship for the different operations within the run-time flow plan. For example, the input/output value manager 1006 may be aware of the input and output data signatures for each action step operation and what values to pass to other action step operation within the run-time flow plan. Based on the observer/observable relationship information, the input/output value manager 1006 uses the output signature from the trigger responder 1004 and/or other executed operations to generate an input value report that indicates which operations' input values are ready. As shown in FIG. 10, the input/output value manager 1006 provides the input value report to the operation ready determination engine 1010 for further evaluation.

Once the operation ready determination engine 1010 receives the flow start signal from the trigger responder 1004, the operation ready determination engine 1010 begins to evaluate which operations are ready to run. FIG. 10 depicts that the operation ready determination engine 1010 receives the input value report that indicates which operation's input values are ready and receives an operations predecessor complete report that indicates which predecessor operations have been completed. The operation ready determination engine 1010 then uses the input value report and operations predecessor complete report to evaluate which operations are ready for execution. Rather than using a shared global state to determine the exact order of operation, the operation ready determination engine 1010 is able to determine whether an operation is ready to run when its input values are ready and the flow engine has completed any predecessor operations. In other words, the flow engine 1002 does not drive, coordinate, or manage when each operations should execute, but instead simplifies the evaluation process by detecting whether each operation's execution state have been met.

After the operation ready determination engine 1010 determines which operations are ready for execution, the operation ready determination engine 1010 sends the ready operation into an operation execution queue 1012. At this point, the operation execution queue 1012 may determine whether to execute one or more of the ready operations in a parallel or sequential fashion. To execute the ready operations, the operation execute queue 1012 may call the operation execution engine 1014 that executes the ready operation using one or more worker threads. The results of the operation execution 1014 are then sent back to the input/output value manager 1006 and predecessor operation reference engine 1008 to update and annotate the run-time state information for the run-time flow plan.

Figure 11:
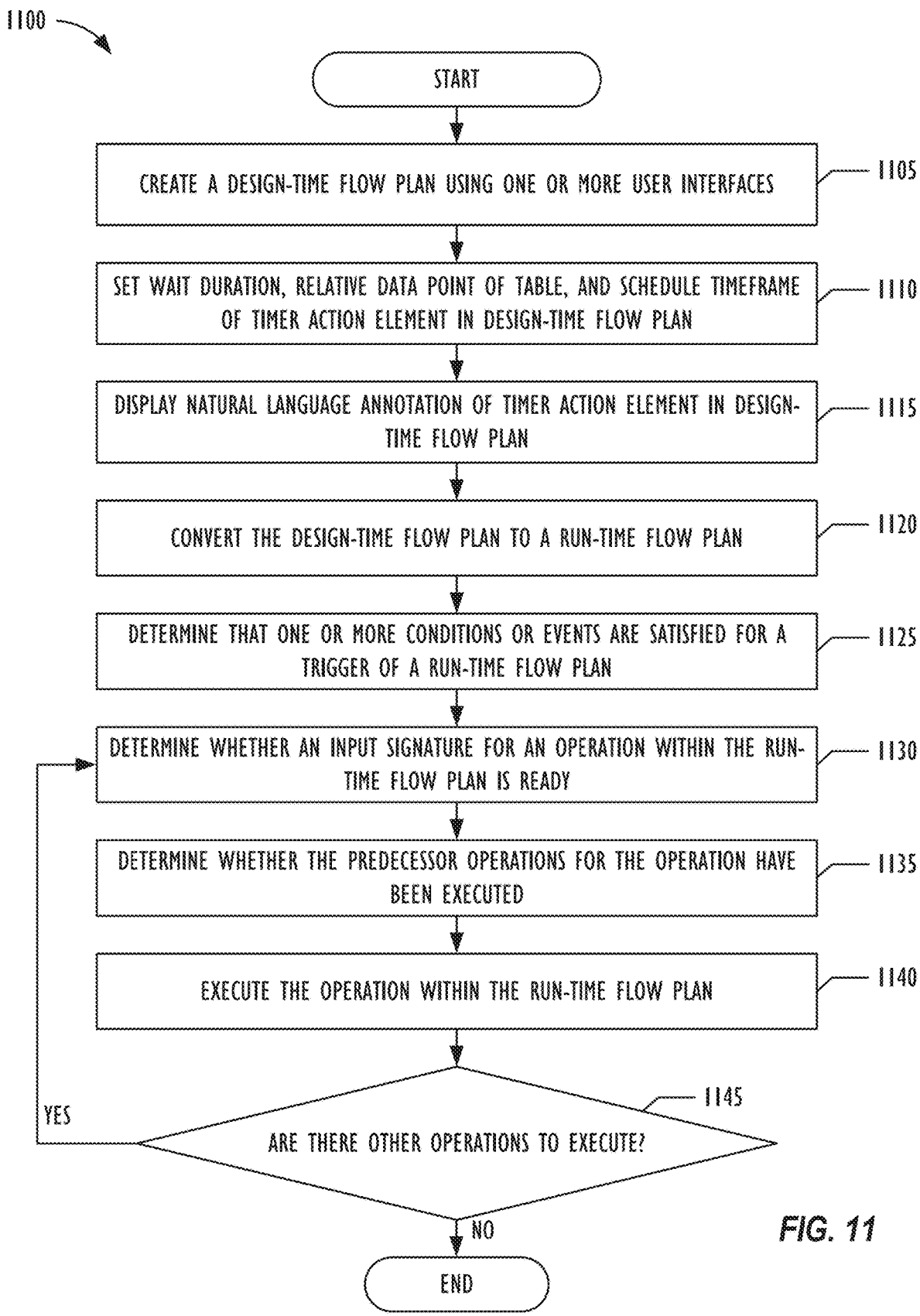
FIG. 11 is a flowchart of an embodiment of a method that creates and executes a flow plan that implements a timer action element.

FIG. 11 is a flowchart of an embodiment of method 1100 that creates and executes a flow plan (or sub-flow plan) that implements a timer action element. Method 1100 may create and execute flows using hardware, software, or both. Using FIG. 3 as an example, method 1100 may be implemented using flow plan development platform 322, where flow designer system 350 creates the design-time flow plan, the flow plan builder API 375 converts the design-time flow plan to a run-time flow plan, and the flow engine 380 executes the run-time flow plan. In one embodiment, method 1100 may be implemented on a flow engine located in a client instance. In another embodiment, method 1100 may be implemented on a two separate flow engines, one located on a client instance and another located on another remote computing system, such as a MID server. Although FIG. 11 illustrates that the blocks of method 1100 are implemented in a sequential operation, other embodiments of method 1100 may have two or more blocks implemented in parallel operations. Further, in one or more embodiments, not all blocks may need to be implemented to create and execute a flow plan that implements a timer action element, or the blocks may be implemented in a different order.

Method 1100 may start at block 1105 to create a design-time flow plan using one or more user interfaces. As discussed in FIGS. 3-6, the user interfaces allow a user to create a design-time flow plan that implements a timer action element and drive a data model that represents the design-time flow plan. Method 1100 may then move to block 1110 in which wait timer setting module 325 and flow plan designer user interface 360 configure settings of the timer action element of the design-time flow plan. As explained previously, a user may operate flow plan designer user interface 360 to specify a length of time, duration type, relative data point in case the duration type is relative duration, and a timeframe (e.g., window of time based on a system schedule) to configure the timer action element of the design-time flow plan (e.g., attributes 415-417 in FIGS. 4-6). Method 1100 may then utilize natural language generation engine 345 of wait timer setting module 325 to display natural language annotation (e.g., function annotation 414 of timer action indicator 404 in FIGS. 4-6) of the timer action element configured at block 1110 in the design-time flow plan. Display of the natural language annotation in the design-time flow plan readily communicates to the user (e.g., flow plan designer) the specific settings of the timer, including the specified timeframe and relative duration settings, if any. This improves efficiency for the designer when creating (or modifying) the design-time flow plan using flow plan designer user interface 400.

Method 1100 may then move to block 1120 to convert (e.g. compile) the design-time flow plan to a run-time flow plan. Method 1100 may not convert the design-time flow plan to the run-time flow plan until an instruction to publish (e.g., activate or save) the design-time flow plan is received as input from a user. Once a user provides instructions via the user interfaces to publish the design-time flow plan, method 1100 may use a flow plan builder for the conversion. From block 1120, method 1100 may continue to block 1125 to determine that one or more conditions or events are satisfied for a trigger (e.g., trigger element of flow or sub-flow) of the run-time flow plan.

Once a run-time flow plan is triggered for execution, method 1100 may then move to block 1130 to determine whether an input signature for an operation within the run-time flow plan is ready (e.g., data required for an action or operation is available, or condition satisfied). Method 1100 may also proceed to block 1135 and determine whether the predecessor operations for the operation have been executed. As discussed above, operations within a run-time flow plan do not execute until the input values for the input signature are ready and/or any predecessor operations have finished executing. After determining that the input signatures are ready and predecessor operations have finished executing, method 1100 may then move to block 1140 to execute the operation within the run-time flow plan (e.g., operation to pause the run-time flow plan for the specified length of time). Method 1100 can then proceed to block 1145 to determine whether other operations remain to be executed within the run-time flow plan. If no other operations remain to be executed, method 1100 ends; otherwise, method 1100 returns back to block 1130.

Figure 12:
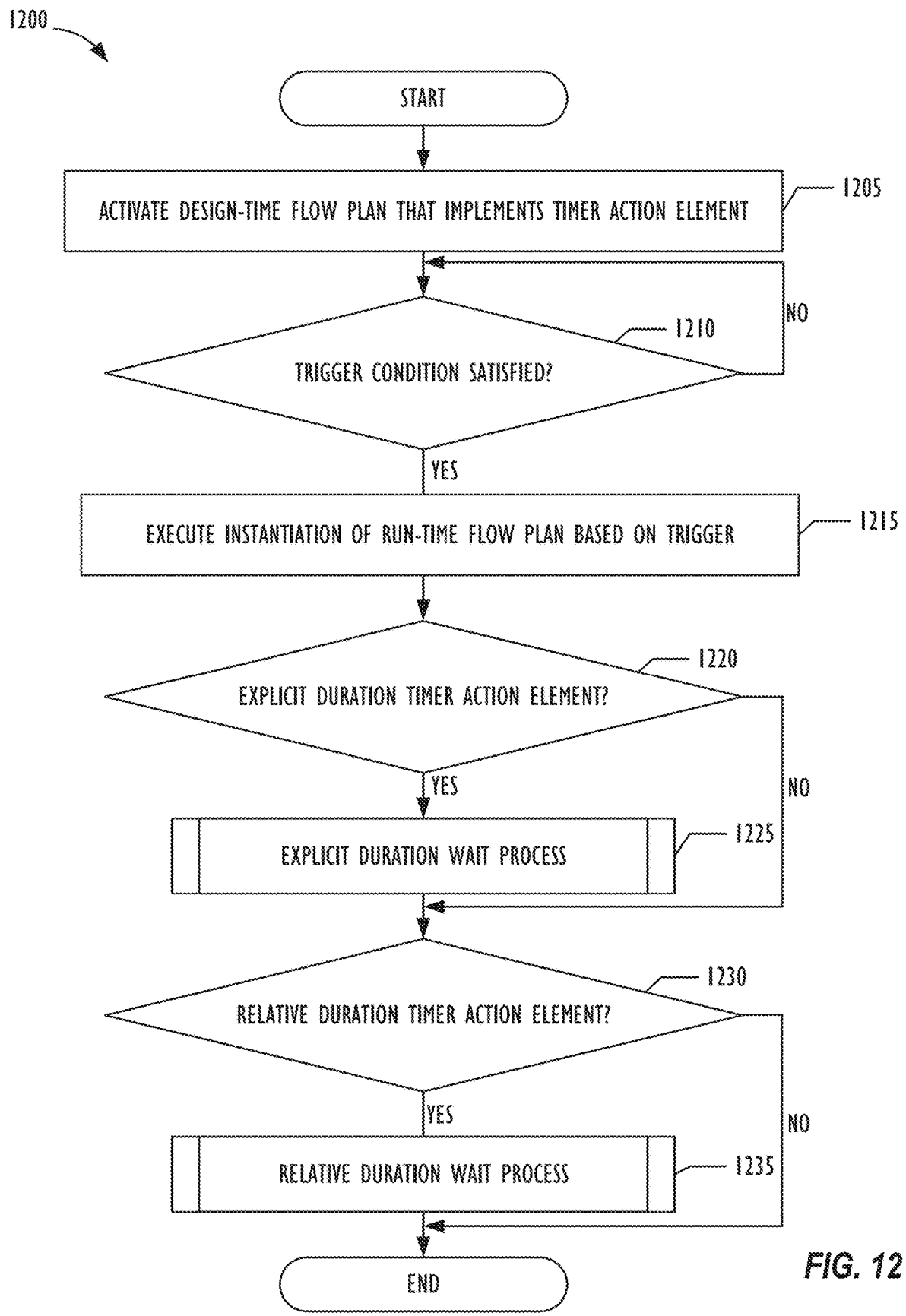
FIG. 12 is a flowchart of an embodiment of a method that executes operations associated with a timer action element within a run-time flow plan.

FIG. 12 is a flowchart of an embodiment of method 1200 that executes operations associated with a timer action element within the run-time flow plan. Method 1200 may execute flow plans using hardware, software, or both. Using FIG. 3 as an example, method 1200 may be implemented using flow plan builder API 375 and flow engines 380 and 315. In one embodiment, method 1200 may be implemented on client instance 320. In another embodiment, method 1200 may be implemented on different components, some of which are located on client instance 320 and others located on another remote computing system, such as MID server 107 of FIG. 1. Although FIG. 12 illustrates that the blocks of method 1200 are implemented in a sequential operation, other embodiments of method 1200 may have two or more blocks implemented in parallel operations. In still other embodiments, operation of one or more blocks may be omitted or one or more additional operations of one or more additional blocks may be added, and/or the operations performed in a different order.

Method 1200 may start at block 1205 when a user operation in flow plan designer user interface 360 activates the design-time flow plan that implements the timer action element. As explained previously, activating the design-time flow plan results in the (current saved version of) design-time flow plan represented by data model 370 being converted into the run-time flow plan by flow plan builder API 375, and storing the generated run-time flow plan. At block 1210, the flow engine of flow plan development platform 322 may determine whether a trigger condition (e.g., trigger element of flow or sub-flow) for executing an instantiation of the run-time flow plan is satisfied. For example, flow engines 380 and 315 may determine whether one or more conditions or events that satisfy the trigger (of flow or sub-flow) have occurred. If the flow engine determines that the trigger condition is satisfied (YES at block 1210), the flow engine executes an instantiation of the run-time flow plan (e.g., JSON document) based on the triggering record (block 1215). As stated previously, the instantiation of the run-time flow plan includes execution of one or more operations associated with one or more actions (including an operation associated with the timer action element that is configured by wait timer setting module 325) in a particular order based on the order defined in the design-time flow plan. Alternately, if the flow engine determines that the trigger condition is not satisfied (NO at block 1210), flow plan development platform 322 continues to wait for the trigger. Recall that since worker threads to support execution of actions are assigned at execution time by inserting scheduled jobs, waiting at block 1210 for the trigger condition to be satisfied does not preempt worker threads from executing other transactions while the trigger condition is unmet. This minimizes performance impact and disruption when executing trigger based automated processes like flow plans or sub-flow plans.

Method 1200 then proceeds to block 1220 where the flow engine determines during execution of the timer action element whether the operation associated with the timer action element is an operation to pause the flow for a specified fixed length of time (Explicit duration timer action element; See, e.g., FIG. 4). The flow engine makes the determination at block 1220 based on the configuration settings of the timer action element by the wait timer setting module 325. If the flow engine determines that the timer action element is of the explicit duration type (YES at block 1220), method 1200 proceeds to block 1225 where the flow engine executes the explicit duration wait process within the run-time flow plan. On the other hand, if the flow engine determines that the timer action element is not of the explicit duration type (NO at block 1220), method 1200 proceeds to block 1230 where flow engine determines whether the operation associated with the timer action element of the flow plan is an operation to pause the flow for a specified length of time relative to a specified data point (Relative duration timer action element; See, e.g., FIG. 5). If the flow engine determines that the timer action element is of the relative duration type (YES at block 1230), method 1200 proceeds to block 1235 where flow engine executes the relative duration wait process within the run-time flow plan. On the other hand, if the flow engine determines that the timer action element is not of the relative duration type (NO at block 1230), method 1200 ends.

Figure 13:
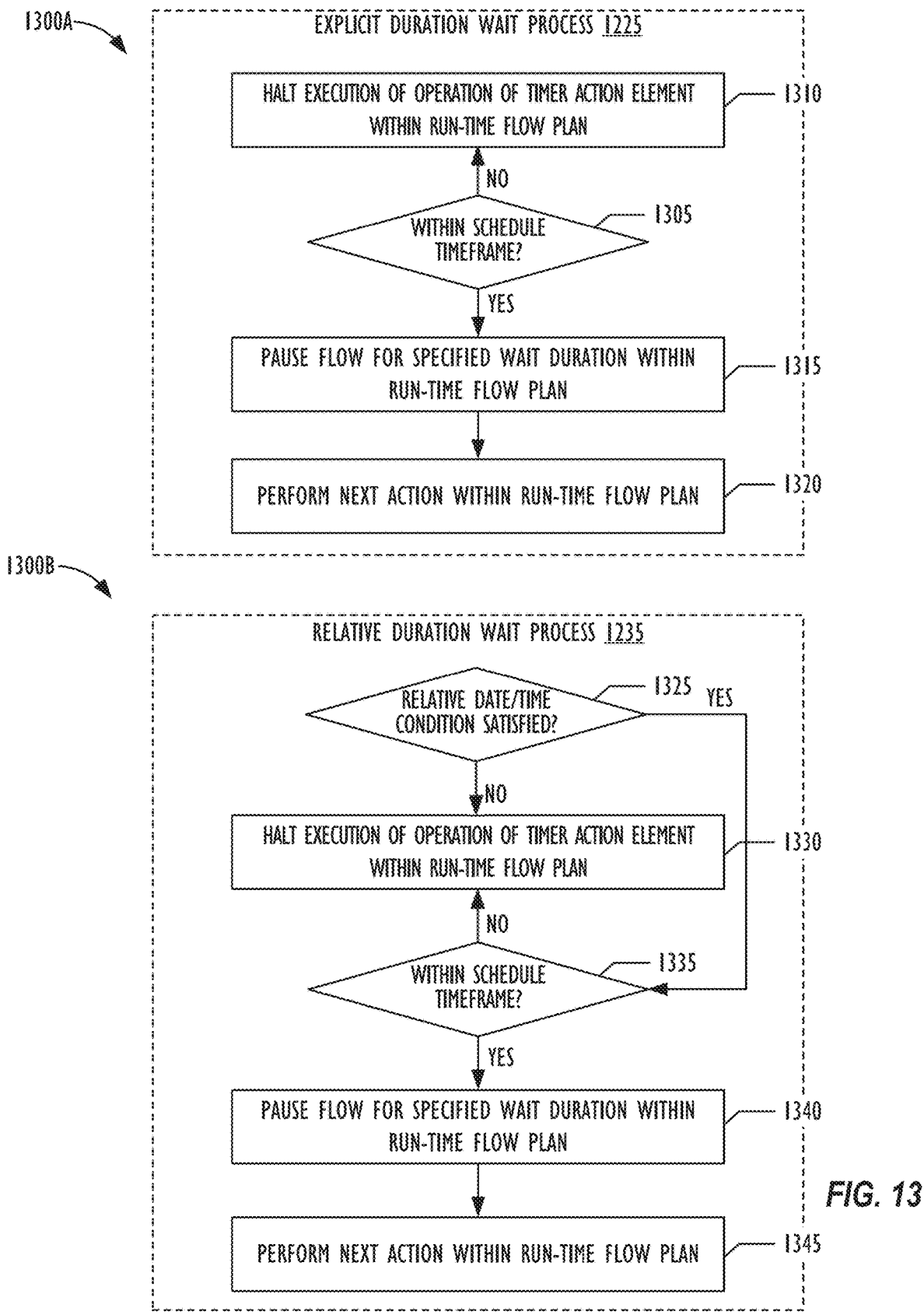
FIG. 13 is a flowchart of embodiments of methods for executing operations of an explicit duration wait process and/or a relative duration wait process of the timer action element.

The explicit duration wait process of block 1225 and the relative duration wait process of block 1235 executed by the flow engine within the run-time flow plan are explained in further detail below in connection with FIG. 13. FIG. 13 is a flowchart of embodiments of methods 1300A and 1300B for executing operations of the explicit duration wait process 1225 and/or a relative duration wait process 1235 of the timer action element. Method 1300A for explicit duration wait process 1225 begins at block 1305 with the flow engine determining within run-time flow plan based on configuration of the timer action element set by wait timer setting module 325 whether the current date and time (e.g., system time, local time, standard time, and the like) is within the timeframe (e.g., Weekdays 8 am-5 pm) specified by the user and set by schedule setting module 335. If the flow engine determines that the current time is not within the timeframe (NO at block 1305), method 1300A proceeds to block 1310 where the flow engine stores the context record of the current state of the run-time flow plan to avoid holding up threads, and halts the execution of the operation of the explicit duration wait process 1225 for the current instantiation of the run-time flow plan. The flow engine at block 1310 may also, for example, insert a scheduled job for the run-time flow plan into a scheduler queue to "wake up" the flow plan in a specified time and resume execution of the explicit duration wait process 1225 within the run-time flow plan when the current time is within the specified timeframe.

If, on the other hand, the flow engine determines that the current time is within the specified timeframe (YES at block 1305), method 1300A proceeds to block 1315 where flow engine pauses the run-time flow plan for the length of time specified by the user and set by wait duration setting module 330. In this case also, for example, the flow engine may store the context record of the current state of the run-time flow plan to avoid holding up threads, and insert a scheduled job for the run-time flow plan into a scheduler queue to "wake up" the flow and resume execution of the explicit duration wait process 1225 within the run-time flow plan after elapse of the specified length of time. After the flow engine runs the wait operation corresponding to the timer action element at block 1315, method 1300A proceeds to block 1320 where flow engine performs one or more other operations associated with one or more other actions in the execution order defined by the one or more other action elements of the design-time flow plan (or sub-flow plan). In one embodiment, the flow engine may continue the wait process at block 1315 only during the scheduled timeframe, and halt the wait process when the current date and time value has surpassed the specified timeframe. Thus, for example, if the specified timeframe is Weekdays 8 am-5 pm, and if, based on a trigger, the flow engine starts a wait operation that is configured to pause a flow for 3 hours at 4 PM on a Friday, the flow engine may halt the "wait" operation at 5 PM on Friday (block 1310), and resume the wait operation at 8 am on Monday to pause the flow for 2 more hours (block 1315), so as to complete the 3-hour wait operation at 10 am on Monday.

Method 1300B for relative duration wait process 1235 begins at block 1325 with the flow engine determining within run-time flow plan based on configuration of the timer action element set by wait timer setting module 325 whether the relative date/time condition is satisfied. In one embodiment, the relative date/time condition may be based on a data point set by the user and specified by data point setting module 340. That is, the relative date/time condition may be defined based on a date and time value stored in the specified data point of the triggering record that is responsible for the current instantiation of the run-time flow plan. In one embodiment, the date and time value may get stored in the specified data point as a result of another action element that is configured for execution prior to the timer action element in the run-time flow plan. Once the operation associated with the other action element is executed and the date and time value generated and stored in the specified data point associated with the triggering record, the flow engine may determine whether the wait operation timer is ready to start based on the date/time stored in the specified data point. For example, for the timer action element of the embodiment shown in FIG. 5, the flow engine determines at run-time that the wait timer is ready to start when a current time exceeds the date and time stored in the "RunStartTime" data point of the triggering record. Thus, in this case, the flow engine pauses the flow for the specified length of time after the date and time specified by the value stored in "RunStartTime" data point of the trigger record exceeds current standard time. As another example, the flow engine may pause the flow for the specified length of time before the date and time specified by the value stored in "RunStartTime" data point of the trigger record exceeds the current standard time. At block 1325, if the flow engine determines that the relative date/time condition is not satisfied (NO at block 1325), method 1300B proceeds to block 1330 where flow engine stores the context record of the current state of the run-time flow plan to avoid holding up threads and halts the execution of the operation of the relative duration wait process 1235 for the current instantiation of the run-time flow plan. The flow engine at block 1330 may also, for example, insert a scheduled job for the run-time flow plan into a scheduler queue to wake up the flow and resume execution of the relative duration wait process 1235 within the run-time flow plan when the relative date/time condition is satisfied (e.g., the time associated with the specified data point arrives).

At block 1325, if the flow engine determines that the relative date/time condition is satisfied (YES at block 1325), method 1300B proceeds to block 1335 where the flow engine determines based on configuration of the timer action element set by wait timer setting module 325 whether the current time is within the timeframe specified by the user and set by schedule setting module 335. If the flow engine determines that the current time is not within the timeframe (NO at block 1335), method 1300A proceeds to block 1330 and halts execution as stated above. If, on the other hand, the flow engine determines that the current time is within the specified timeframe (YES at block 1335), method 1300A proceeds to block 1340 where flow engine pauses the run-time flow plan for the length of time specified by the user and set by wait duration setting module 330. After the flow engine runs the wait operation corresponding to the timer action element at block 1340, method 1300B proceeds to block 1345 where the flow engine performs within the run-time flow plan, one or more other operations associated with one or more other actions in the execution order defined by one or more other action elements of the design-time flow plan (or sub-flow plan). Operations performed at blocks 1340 and 1345 are substantially similar to operations performed at blocks 1315 and 1320 of explicit duration wait process 1225 and detailed description thereof is omitted here.

Although FIG. 13 illustrates that blocks of methods 1300A and 1300B are implemented in a sequential operation with a particular sequential order, other embodiments of methods 1300A and 1300B may have two or more blocks implemented in parallel operations. In still other embodiments, operation of one or more blocks may be performed in a different order or may be entirely omitted, or one or more additional operations of one or more additional blocks may be added.

Figure 14:
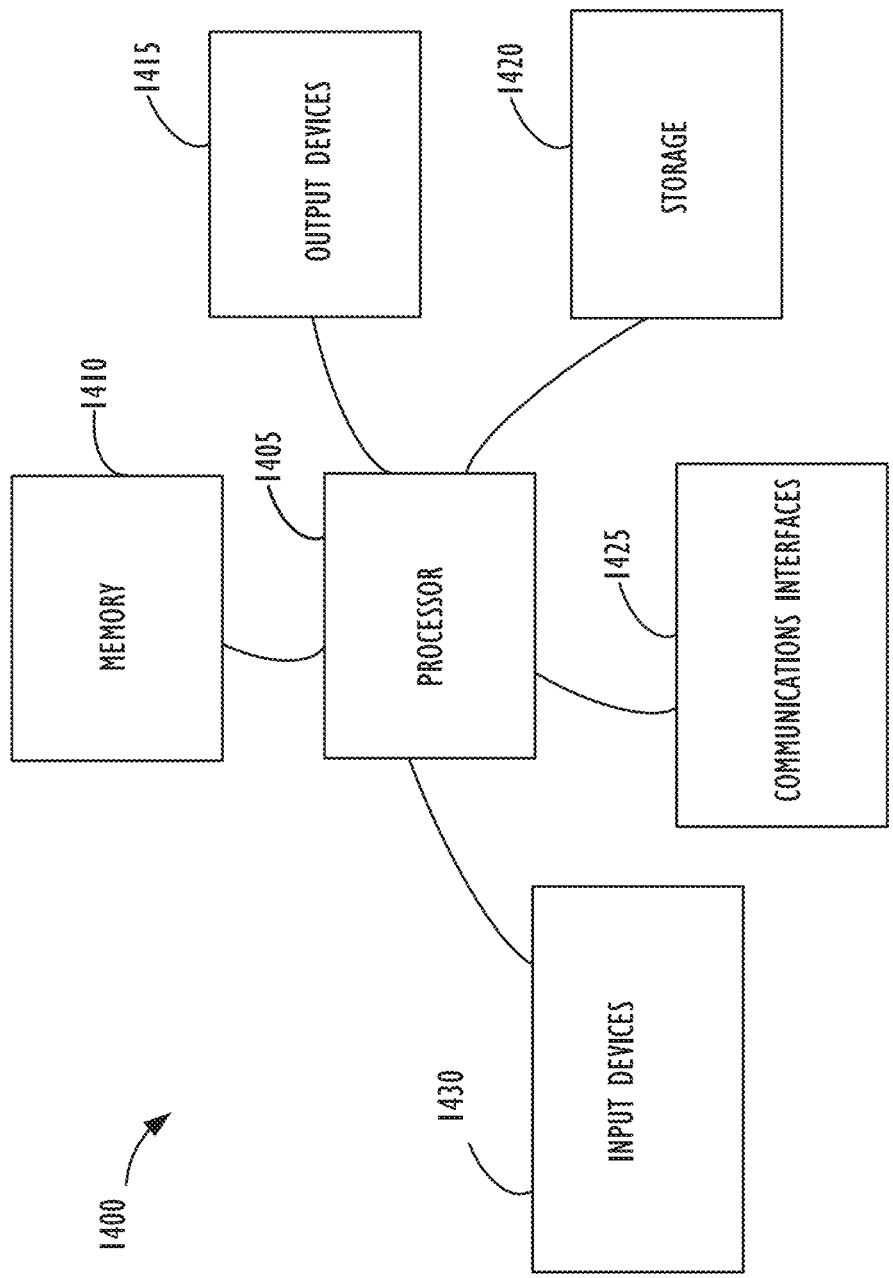
FIG. 14 illustrates a block diagram of a computing system for use with implementing one or more of the disclosed embodiments.

FIG. 14 illustrates a high-level block diagram 1400 of a processing device (computing system) that may be used to implement one or more disclosed embodiments (e.g., cloud resources platform/network 110, client devices 104A-104E, remote client device 305, client instance 320, flow designer system 350, etc.). For example, computing device 1400 illustrated in FIG. 14 could represent a client device or a physical server device and include either hardware or virtual processor(s) depending on the level of abstraction of the computing device. In some instances (without abstraction) computing device 1400 and its elements as shown in FIG. 14 each relate to physical hardware and in some instances one, more, or all of the elements could be implemented using emulators or virtual machines as levels of abstraction. In any case, no matter how many levels of abstraction away from the physical hardware, computing device 1400 at its lowest level may be implemented on physical hardware. As also shown in FIG. 14, computing device 1400 may include one or more input devices 1430, such as a keyboard, mouse, touchpad, or sensor readout (e.g., biometric scanner) and one or more output devices 1415, such as displays, speakers for audio, or printers. Some devices may be configured as input/output devices also (e.g., a network interface or touch-screen display). Computing device 1400 may also include communications interfaces 1425, such as a network communication unit that could include a wired communication component and/or a wireless communications component, which may be communicatively coupled to processor 1405. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), Wi-Fi, cellular, and/or other communication methods.

As illustrated in FIG. 14, processing device 1400 includes a processing element such as processor 1405 that contains one or more hardware processors, where each hardware processor may have a single or multiple processor cores. In one embodiment, the processor 1405 may include at least one shared cache that stores data (e.g., computing instructions) that are utilized by one or more other components of processor 1405. For example, the shared cache may be a locally cached data stored in a memory for faster access by components of the processing elements that make up processor 1405. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) a microprocessor. Although not illustrated in FIG. 14, the processing elements that make up processor 1405 may also include one or more other types of hardware processing components, such as graphics processing units (GPUs), application specific integrated circuits (ASICs), field-programmable gate arrays (FPGAs), and/or digital signal processors (DSPs).

FIG. 14 illustrates that memory 1410 may be operatively and communicatively coupled to processor 1405. Memory 1410 may be a non-transitory medium configured to store various types of data. For example, memory 1410 may include one or more volatile devices such as random access memory (RAM). Non-volatile storage devices 1420 can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage devices 1420 may be used to store overflow data if allocated RAM is not large enough to hold all working data. The non-volatile storage devices 1420 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 1405. In one embodiment, the compiling process of the software program may transform program code written in a programming language to another computer language such that the processor 1405 is able to execute the programming code. For example, the compiling process of the software program may generate an executable program that provides encoded instructions (e.g., machine code instructions) for processor 1405 to accomplish specific, non-generic, particular computing functions.

After the compiling process, the encoded instructions may then be loaded as computer executable instructions or process steps to processor 1405 from storage 1420, from memory 1410, and/or embedded within processor 1405 (e.g., via a cache or on-board ROM). Processor 1405 may be configured to execute the stored instructions or process steps in order to perform instructions or process steps to transform the computing device into a non-generic, particular, specially programmed machine or apparatus. Stored data, e.g., data stored by a storage device 1420, may be accessed by processor 1405 during the execution of computer executable instructions or process steps to instruct one or more components within computing system 1400.

A user interface (e.g., output devices 1415 and input devices 1430) can include a display, positional input device (such as a mouse, touchpad, touchscreen, or the like), keyboard, or other forms of user input and output devices. The user interface components may be communicatively coupled to processor 1405. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing system 1400 may comprise other components well known in the art, such as sensors, powers sources, and/or analog-to-digital converters, not explicitly shown in FIG. 14.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A system comprising:

non-transitory memory; and one or more hardware processors configured to read instructions from the non-transitory memory to cause the one or more hardware processors to:

set a specified wait duration for a timer action element of a design-time workflow plan representing a workflow to be executed, the specified wait duration being set relative to a date and time value of a specified data point of a table associated with the design-time workflow plan, wherein an operation associated with the timer action element executes at run-time upon activation of a trigger element and at or after the date and time value of the specified data point to pause the workflow for the specified wait duration prior to execution of an operation associated with an action element that is set to execute subsequent to the timer action element in the design-time workflow plan;

set a specified recurring timeframe for the timer action element of the design-time workflow plan, wherein the operation associated with the timer action element to pause the workflow for the specified wait duration executes at run-time during the specified recurring timeframe when, upon the activation of the trigger element, a current date and time value is within the specified recurring timeframe, wherein the specified recurring timeframe comprises a recurring time window having a recurring start time and a recurring end time different from the recurring start time, and wherein execution of the operation associated with the timer action element is temporarily halted when the current date and time value is outside the specified recurring timeframe;

display a natural language annotation associated with the timer action element of the design-time workflow plan, wherein the natural language annotation presents the specified wait duration and the specified recurring timeframe for the timer action element in a human-readable format in the design-time workflow plan; and activate the design-time workflow plan to execute the workflow.

2. The system according to claim 1, wherein the one or more hardware processors are configured to read instructions from the non-transitory memory to cause the one or more hardware processors to set from among a plurality of data points of the table associated with the design-time workflow plan, the specified data point in response to a user operation.

3. The system according to claim 1, wherein the one or more hardware processors are configured to read instructions from the non-transitory memory to cause the one or more hardware processors to:
set the trigger element of the design-time workflow plan so that the trigger element activates in response to one or more predetermined computing conditions being satisfied.

4. The system according to claim 3, wherein the one or more predetermined computing conditions of the trigger element of the design-time workflow plan include one of a create, read, update, or delete operation for a record matching a filter condition on the table associated with the design-time workflow plan, expiration of a timer, and arrival of an inbound Representational State Transfer Application Programming Interface (REST API) call.

5. The system according to claim 4, wherein the one or more hardware processors are configured to read instructions from the non-transitory memory to cause the one or more hardware processors to:
convert the activated design-time workflow plan into a run-time workflow plan in response to the trigger element being activated;
determine whether the current date and time value falls within the specified recurring timeframe; and
in response to determining that the current date and time value falls within the specified recurring timeframe, execute within the run-time workflow plan the operation associated with the timer action element to pause the workflow for the specified wait duration relative to the date and time value for the specified data point of the record that is on the table and that is associated with the activation of the trigger element.

6. The system according to claim 5, wherein:
the design-time workflow plan is a design-time sub-workflow plan,
the specified data point of the table is set as an input for the design-time sub-workflow plan, and
the design-time sub-workflow plan is converted to a run-time sub-workflow plan in response to arrival of the inbound REST API call.

7. The system according to claim 5, wherein the one or more hardware processors are configured to read instructions from the non-transitory memory to cause the one or more hardware processors to:
determine within the run-time workflow plan whether the current date and time value is outside the specified recurring timeframe; and
in response to determining that the current date and time value is outside the specified recurring timeframe, temporarily halt within the run-time workflow plan the execution of the operation associated with the timer action element, wherein the execution of the operation associated with the timer action element to pause the workflow for the specified wait duration resumes when it is determined that the current date and time value is within the specified recurring timeframe.

8. The system according to claim 5, wherein the date and time value for the specified data point of the record in the table is generated based on execution within the run-time workflow plan of an operation associated with an action element that is set in the design-time workflow plan to execute prior to execution of the timer action element.

9. The system according to claim 2, wherein the user operation comprises movement of the specified data point from a first component of a graphical user interface (GUI) to a second component of the GUI.

10. The system according to claim 1, wherein activating the design-time workflow plan to execute the workflow comprises compiling the design-time workflow plan by calling a workflow plan builder Application Programming Interface (API).

11. The system according to claim 1, wherein execution of the operation associated with the timer action element is configured to resume when the current date and time is again within the specified recurring timeframe.

12. A method comprising:
setting a specified wait duration for a timer action element of a design-time workflow plan representing a workflow to be executed, the specified wait duration being set relative to a date and time value of a specified data point of a table associated with the design-time workflow plan, wherein an operation associated with the timer action element executes at run-time upon activation of a trigger element and at or after the date and time value of the specified data point to pause the workflow for the specified wait duration prior to execution of an operation associated with an action element that is set to execute subsequent to the timer action element in the design-time workflow plan;
setting a specified recurring timeframe for the timer action element of the design-time workflow plan, wherein the operation associated with the timer action element to pause the workflow for the specified wait duration executes at run-time during the specified recurring timeframe when, upon the activation of the trigger element, a current date and time value is within the specified recurring timeframe, wherein the specified recurring timeframe comprises a recurring time window having a recurring start time and a recurring end time different from the recurring start time, and wherein execution of the operation associated with the timer action element is temporarily halted when the current date and time value is outside the specified recurring timeframe;
displaying a natural language annotation associated with the timer action element of the design-time workflow plan, wherein the natural language annotation presents the specified wait duration and the specified recurring timeframe for the timer action element in a human-readable format in the design-time workflow plan; and
activating the design-time workflow plan to execute the workflow.

13. The method according to claim 12, comprising setting from among a plurality of data points of the table associated with the design-time workflow plan, the specified data point in response to a user operation.

14. The method according to claim 12, comprising setting the trigger element of the design-time workflow plan so that the trigger element activates in response to one or more predetermined computing conditions being satisfied.

15. The method according to claim 14, wherein the one or more predetermined computing conditions of the trigger element of the design-time workflow plan include one of a create, read, update, or delete operation for a record matching a filter condition on the table associated with the design-time workflow plan, expiration of a timer, and arrival of an inbound Representational State Transfer Application Programming Interface (REST API) call.

16. The method according to claim 15, comprising:
converting the activated design-time workflow plan into a run-time workflow plan in response to the trigger element being activated;
determining whether the current date and time value falls within the specified recurring timeframe; and
in response to determining that the current date and time value falls within the specified recurring timeframe, executing within the run-time workflow plan the operation associated with the timer action element to pause the workflow for the specified wait duration relative to the date and time value for the specified data point of the record that is on the table and that is associated with the activation of the trigger element.

17. The method according to claim 16, wherein:
the design-time workflow plan is a design-time sub-workflow plan,
the specified data point of the table is set as an input for the design-time sub-workflow plan, and
the design-time sub-workflow plan is converted to a run-time sub-workflow plan in response to arrival of the inbound REST API call.

18. The method according to claim 16, wherein the run-time workflow plan is executed so that the operation to pause the workflow for the specified wait duration executes after arrival of a date and time corresponding to the date and time value for the specified data point of the record associated with the activation of the trigger element, and during the specified recurring timeframe.

19. A non-transitory computer-readable recording medium having stored thereon a program, the program comprising instructions that, when executed by one or more hardware processors, cause the one or more hardware processors to:
set a specified wait duration for a timer action element of a design-time workflow plan representing a workflow to be executed, the specified wait duration being set relative to a date and time value of a specified data point of a table associated with the design-time workflow plan, wherein an operation associated with the timer action element executes at run-time upon activation of a trigger element and at or after the date and time value of the specified data point to pause the workflow for the specified wait duration prior to execution of an operation associated with an action element that is set to execute subsequent to the timer action element in the design-time workflow plan;
set a specified recurring timeframe for the timer action element of the design-time workflow plan, wherein the operation associated with the timer action element to pause the workflow for the specified wait duration executes at run-time during the specified recurring timeframe when, upon the activation of the trigger element, a current date and time value is within the specified recurring timeframe, wherein the specified recurring timeframe comprises a recurring time window having a recurring start time and a recurring end time different from the recurring start time, and wherein execution of the operation associated with the timer action element is temporarily halted when the current date and time value is outside the specified recurring timeframe;
display a natural language annotation associated with the timer action element of the design-time workflow plan, wherein the natural language annotation presents the specified wait duration and the specified recurring timeframe for the timer action element in a human-readable format in the design-time workflow plan; and
activate the design-time workflow plan to execute the workflow.

20. The non-transitory computer-readable recording medium according to claim 19, comprising instructions that, when executed by one or more hardware processors, cause the one or more hardware processors to:
set the trigger element of the design-time workflow plan so that the trigger element activates in response to one or more predetermined computing conditions being satisfied,
wherein the one or more predetermined computing conditions of the trigger element of the design-time workflow plan include one of a create, read, update, or delete operation for a record matching a filter condition on the table associated with the design-time workflow plan, expiration of a timer, and arrival of an inbound Representational State Transfer Application Programming Interface (REST API) call.

\* \* \* \* \*